(12) United States Patent
Gentry et al.

(10) Patent No.: US 7,590,854 B2
(45) Date of Patent: Sep. 15, 2009

(54) HIERARCHICAL IDENTITY-BASED ENCRYPTION AND SIGNATURE SCHEMES

(75) Inventors: Craig B. Gentry, Mountain View, CA (US); Alice Silverberg, Columbus, OH (US)

(73) Assignee: NTT DoCoMo, Inc., Tokyo (JP)

( * ) Notice: Subject to any disclaimer, the term of this patent is extended or adjusted under 35 U.S.C. 154(b) by 88 days.

(21) Appl. No.: 11/923,148

(22) Filed: Oct. 24, 2007

(65) Prior Publication Data
US 2008/0052521 A1 Feb. 28, 2008

Related U.S. Application Data

(60) Continuation of application No. 11/552,076, filed on Oct. 23, 2006, now Pat. No. 7,337,322, which is a division of application No. 10/384,328, filed on Mar. 7, 2003, now Pat. No. 7,349,538.

(60) Provisional application No. 60/366,292, filed on Mar. 21, 2002, provisional application No. 60/366,196, filed on Mar. 21, 2002.

(51) Int. Cl.
H04L 9/32 (2006.01)
G06F 21/22 (2006.01)

(52) U.S. Cl. .................... 713/180; 713/176

(58) Field of Classification Search .................. None
See application file for complete search history.

(56) References Cited

U.S. PATENT DOCUMENTS

| | | |
|---|---|---|
| 4,309,569 A | 1/1982 | Merkle |
| 5,432,852 A | 7/1995 | Leighton et al. |
| 5,590,197 A | 12/1996 | Chen et al. |
| 5,638,447 A * | 6/1997 | Micali .................. 713/180 |
| 5,708,714 A * | 1/1998 | Lopez et al. ............ 713/180 |

(Continued)

FOREIGN PATENT DOCUMENTS

EP 1 051 036 A2 8/2000

OTHER PUBLICATIONS

Dutta, Ratna et al. "Pairing-Based Cryptographic Protocols: A Survey" Cryptographic Research Group. 2004.

(Continued)

*Primary Examiner*—Christopher A Revak
(74) *Attorney, Agent, or Firm*—Haynes and Boone, LLP

(57) ABSTRACT

A signature {Sig, $\{Q_i\}$} is generated on a message M by a signer $E_t$ in a hierarchical system including the entities $E_0$, $E_1, \ldots, E_t$, each entity $E_i$ ($i>0$) being a child of $E_{i-1}$. Here $$Sig = S_t + s_t P_M = \sum_{i=1}^{t} s_{i-1} P_i,$$

where: each $S_i$ is a secret key of $E_i$; each $s_i$ is a secret of $S_i$; $P_M$ is a public function of M; each $P_i$ is a public function of the ID's of all entities $E_j$ such that $1 \leq j \leq i$; each $Q_i = s_i P_0$ where $P_0$ is public. The verifier confirms that $$\frac{\hat{e}(P_0, Sig)}{\hat{e}(Q_t, P_M) \prod_i \hat{e}(Q_{i-1}, P_i)} = V,$$

where: the product $\Pi_i \hat{e}(Q_{i-1}, P_i)$ is taken over all integers i in a proper subset of the integers from 1 to t inclusive; ê is a bilinear non-degenerate mapping; V can be $\hat{e}(Q_0, P_{i_0})$ where $i_0$ is predefined (e.g. 1), or V can be another expression is a verifier is part of the hierarchical system.

25 Claims, 9 Drawing Sheets

U.S. PATENT DOCUMENTS

| | | | |
|---|---|---|---|
| 5,774,552 | A | 6/1998 | Grimmer |
| 5,867,578 | A | 2/1999 | Brickell et al. |
| 6,141,420 | A | 10/2000 | Vanstone et al. |
| 6,212,637 | B1 | 4/2001 | Ohta et al. |
| 6,298,153 | B1* | 10/2001 | Oishi .......................... 382/186 |
| 6,618,483 | B1 | 9/2003 | Vanstone et al. |
| 6,760,441 | B1 | 7/2004 | Ellison et al. |
| 6,826,687 | B1 | 11/2004 | Rohatgi |
| 6,886,296 | B1 | 5/2005 | John et al. |
| 7,088,822 | B2 | 8/2006 | Asano |
| 7,113,594 | B2 | 9/2006 | Boneh et al. |
| 7,178,025 | B2 | 2/2007 | Scheidt et al. |
| 7,224,804 | B2 | 5/2007 | Ishiguro et al. |
| 7,225,339 | B2 | 5/2007 | Asano et al. |
| 7,337,322 | B2* | 2/2008 | Gentry et al. ............... 713/176 |
| 7,349,538 | B2* | 3/2008 | Gentry et al. ................ 380/30 |
| 7,443,980 | B2* | 10/2008 | Gentry et al. ................ 380/28 |
| 2002/0025034 | A1 | 2/2002 | Solinas |
| 2002/0154782 | A1 | 10/2002 | Chow et al. |
| 2003/0081785 | A1 | 5/2003 | Boneh et al. |
| 2003/0095665 | A1 | 5/2003 | Wheeler et al. |
| 2003/0097562 | A1 | 5/2003 | Wheeler et al. |
| 2003/0097569 | A1 | 5/2003 | Wheeler et al. |
| 2003/0120931 | A1* | 6/2003 | Hopkins et al. ............. 713/180 |
| 2003/0179885 | A1 | 9/2003 | Gentry et al. |
| 2004/0260926 | A1* | 12/2004 | Arditti Modiano et al. .. 713/170 |
| 2005/0022102 | A1 | 1/2005 | Gentry et al. |
| 2005/0097316 | A1* | 5/2005 | Kim .......................... 713/163 |
| 2005/0169464 | A1 | 8/2005 | Sannino et al. |
| 2005/0246533 | A1 | 11/2005 | Gentry et al. |
| 2006/0126832 | A1 | 6/2006 | Takahashi |
| 2007/0189539 | A1 | 8/2007 | Kim et al. |
| 2008/0152130 | A1* | 6/2008 | Teranishi ..................... 380/30 |
| 2008/0162927 | A1* | 7/2008 | Wang et al. ................. 713/155 |
| 2009/0024852 | A1* | 1/2009 | Yonezawa et al. ........... 713/180 |
| 2009/0034739 | A1* | 2/2009 | Teranishi et al. ............ 380/278 |

OTHER PUBLICATIONS

Gentry, Craig and Silverberg, Alice: "Hierarchical ID-Based Cryptography," May 24, 2002, pp. 1-21, XP002396667.

N. Koblitz, *Elliptic Curve Cryptosystems*, Mathmatics of Computation, vol. 48, No. 177, Jan. 1987, pp. 203-209.

Y. Dodis, M. Yung, *Exposure-Resilience for Free: The Hierarchical ID-Based Encryption Case*.

U. Feige, A. Fiat, A. Shamir, *Zero Knowledge Proofs of Identity*, 1987 ACM 0-89791-22 7/87/0006-0210, pp. 210-217.

S. S. Al-Riyami, K. G. Paterson, *Authenticated Three Party Key Agreement Protocols From Pairings*, 2002.

C. G. Gunther, A. B. Boveri, *An Identity-Based Key-Exchange Protocol*, pp. 29-37.

A. Fiat, A. Shamir, *How to Prove Yourself: Practical Solutions to Identification and Signature Problems*, 1998, pp. 186-194.

J.C. Cha and J.H. Cheon, *An Identity-Based Signature from Gap Diffie-Hellman Groups*, Cryptology ePrint archive, Report 2002/018, 2002. http://eprint.iacr.org/, 2002.

N. P. Smart, *An Identity-Based Authenticated Key Agreement Protocol Based on the Weil Pairing*, Cryptology Eprint Archive, Report 2001/111,2001. http://eprint.iacr.org/, 2001.

D. Boneh, M. Franklin, *Identity-Based Encryption from the Weil Pairing*, Advances in Cryptology—Crypto2001, Springer LNCS 2139.

C. Cocks, *An Identity Based Encryption Scheme Based On Quadratic Equations*.

J. Horwitz, B. Lynn, *Toward Hierarchical Identity-Based Encryption*.

M. Girault, *Self-Certified Public Keys*, 1998, pp. 490-497.

L.C. Guillou, J. Quisquater, *A Practical Zero-Knowledge Protocol Fitted to Security Microprocessor Minimizing Both Transmission and Memory*, Advances in Cryptology—Eurocrypt'88, Lect. Notes in Computer Science, vol. 330, pp. 123-128, Springer Verlag (1988).

R. Bloom, *An Optimal Class of Symmetric Key Generation Systems*, 1998, pp. 336-338.

C. Blundo, A. De Santis, A. Herzberg, S. Kutten, U. Vaccaro, M. Yung, *Perfectly-Secure Key Distribution for Dynamic Conferences*, 1998, Springer-Verlag, pp. 471-486.

F. Hess, *Exponent Group Signature Schemes and Efficient Identity Based Signature Schemes based on Pairings*, Cryptology Eprint Archive, Report 2002/012, 2002. http://eprrint.iacr.org/, 2002.

K. Rubin, A. Silverberg, *Supersingular Abelian Varieties in Cryptology*.

W. Diffie, M. E. Hellman, *New Directions in Cryptography*, pp. 29-40.

A. Menezes, P. van Oorschot, S. Vanstone, *Chapter 12 Key Establishment Protocols*, Handbook of Applied Cryptography, 1997, pp. 489-541.

V.S. Miller, *Use of Elliptic Curves in Cryptography*, 1998, pp. 417-426.

D. Boneh, B. Lynn, H. Shacham, *Short Signatures from the Weil Pairing*, Advances in Cryptology: Asiacrypt 2001 (LNCS 2248), pp. 514-532, 2001.

E. Fujisaki, T. Okamoto, *Secure Integration of Asymmetric and Symmetric Encryption Schemes*, Michael Wiener (Ed.): CRYTPTO'99, LNCS 1666, pp. 537-554, 1999.

A. Shamir, *Identity-Based Cryptosystems and Signature Schemes*, 1998, Springer-Verlag, pp. 46-53.

U. Maurer, Y. Yacobi, *A Remark on a Non-Interactive Public-Key Distribution System*, 1998.

G. Hanaoka, T. Nishioka, Y. Zheng, H. Imai, *A Hierarchical Non-interactive Key-Sharing Scheme with Low Memory Size and High Resistance Against Collusion Attacks*, The Computer Journal, vol. 45, No. 3, 2002.

G. Hanaoka, T. Nishioka, Y. Zheng, H. Imai, *An Efficient Hierarchical Identity-Based Key-Sharing Method Resistant Against Collusion-Attacks*, JSPS-REFT 96P00604, pp. 348-362.

A. Joux, A One Round Protocol for Tripartite Diffie-Hellman, W. Bosma (Ed.), ANTS-IV, LNCS 1838, pp. 385-393, 2000.

Sakai, Ryuichi et al., "Cryptosystems Based on Pairing", The 2000 Symposium on Cryptography and Information Security, Okinawa, Japan, Jan. 26-28, 2000, SCIS2000—C20.

Sakai, Ryuichi et al., "Cryptosystems Based on Pairing over Elliptic Curve", The 2001 Symposium on Cryptography and Information Security, Oiso, Japan, Jan. 23-26, 2001, The Institute of Electronics, Information and Communication Engineers.

Sakai, Ryuichi et al., "Crypt schemes based on Weil Pairing," pp. 1-12.

Okamato, "A Digital Multisignature Scheme Using Bijective Public Key Cryptosystems," ACM Transactions on Computer Systems, Vo. 6, No. 8, Nov. 1992, pp. 432-441.

Boyd, "Multisignatures Based on Zero Knowledge Schemes", Electronic Letters, Oct. 1991, Fol. 27, No. 22, pp. 1-3.

* cited by examiner

HIERARCHICAL IDENTITY-BASED ENCRYPTION AND SIGNATURE SCHEMES

RELATED APPLICATIONS

The present application is a continuation of U.S. patent application Ser. No. 11/552,076, filed Oct. 23, 2006, which is now U.S. Pat. No. 7,337,322, incorporated herein by reference, which is a division of U.S. patent application Ser. No. 10/384,328, filed Mar. 7, 2003, which is now U.S. Pat. No. 7,349,538, incorporated herein by reference, which claims priority under 35 U.S.C. § 119(e) to provisional U.S. patent applications Ser. No. 60/366,292, filed on Mar. 21, 2002, and Ser. No. 60/366,196, filed on Mar. 21, 2002, both of which are incorporated herein by reference.

BACKGROUND OF THE INVENTION

The present invention relates in general to cryptography and secure communication via computer networks or via other types of systems and devices, and more particularly to hierarchical, identity-based schemes for encrypting and decrypting communications.

Roughly speaking, identity-based cryptosystems are public key cryptosystems in which the public key of an entity is derived from information associated with the entity's identity. For instance, the identity information may be personal information (i.e., name, address, email address, etc.), or computer information (i.e., IP address, etc.). However, identity information may include not only information that is strictly related to an entity's identity, but also widely available information such as the time or date. That is, the importance of the concept of identity information is not its strict relation to the entity's identity, but that the information is readily available to anyone who wishes to encrypt a message to the entity.

An entity's private key is generated and distributed by a trusted party or logical process, typically known as a private key generator ("PKG"). The PKG uses a master secret to generate private keys. Because an entity's public key may be derived from its identity, when Alice wants to send a message to Bob, she does not need to retrieve Bob's public key from a database. Instead, Alice merely derives the key directly from Bob's identifying information. Databases of public keys are unnecessary. Certificate authorities ("CAs") also are unnecessary. There is no need to "bind" Bob's identity to his public key because his identity is his public key.

The concept of identity-based cryptosystems is not new. It was proposed in A. Shamir, *Identity-Based Cryptosystems and Signatures Schemes*, ADVANCES IN CRYPTOGRAPHY—CRYPTO '84, Lecture Notes in Computer Science 196 (1984), Springer, 47-53. However, practical identity-based encryption schemes have not been found until recently. For instance, identity-based schemes were proposed in C. Cocks, *An Identity-Based Encryption Scheme Based on Quadratic Residues*, available at http://www.cesg.gov.uk/technology/id-pkc/media/ciren.pdf; D. Boneh, M. Franklin, *Identity Based Encryption from the Weil Pairing*, ADVANCES IN CRYPTOLOGY—CRYPTO 2001, Lecture Notes in Computer Science 2139 (2001), Springer, 213-229; and D. Boneh, M. Franklin, *Identity Based Encryption from the Weil Pairing* (extended version), available at http://www.cs.stanford.edu/~dabo/papers/ibe.pdf. Cocks's scheme is based on the "Quadratic Residuosity Problem," and although encryption and decryption are reasonably fast (about the speed of RSA), there is significant message expansion (i.e., the bit-length of the ciphertext is many times the bit-length of the plaintext). The Boneh-Franklin scheme bases its security on the "Bilinear Diffie-Hellman Problem," and it is quite fast and efficient when using Weil or Tate pairings on supersingular elliptic curves or abelian varieties.

However, the known identity-based encryption schemes have a significant shortcoming—they are not hierarchical. In non-identity-based public key cryptography, it has been possible to have a hierarchy of CAs in which the root CA can issue certificates for other CAs, who in turn can issue certificates for users in particular domains. This is desirable because it reduces the workload on the root CA. A practical hierarchical scheme for identity-based cryptography has not been developed.

Ideally, a hierarchical identity-based encryption scheme would involve a hierarchy of logical or actual PKGs. For instance, a root PKG may issue private keys to other PKGs, who in turn would issue private keys to users in particular domains. It also would be possible to send an encrypted communication without an online lookup of the recipient's public key or lower-level public parameters, even if the sender is not in the system at all, as long as the sender obtained the public parameters of the root PKG. Another advantage of a hierarchical identity-based encryption scheme would be damage control. For instance, disclosure of a domain PKG's secret would not compromise the secrets of higher-level PKGs, or of any other PKGs that are not direct descendents of the compromised domain PKG. The schemes taught by Cocks and Boneh-Franklin do not have these properties.

A secure and practical hierarchical identity-based encryption scheme has not been developed. A hierarchical identity-based key sharing scheme with partial collusion-resistance is given in G. Hanaoka, T. Nishioka, Y. Zheng, H. Imai, *An Efficient Hierarchical Identity-Based Key-Sharing Method Resistant Against Collusion Attacks*, ADVANCES IN CRYPTOGRAPHY—ASIACRYPT 1999, Lecture Notes in Computer Science 1716 (1999), Springer 348-362; and G. Hanaoka, T. Nishioka, Y. Zheng, H. Imai, *A Hierarchical Non-Interactive Key-Sharing Scheme With Low Memory Size and High Resistance Against Collusion Attacks*, to appear in THE COMPUTER JOURNAL. In addition, an introduction to hierarchical identity-based encryption was provided in J. Horwitz, B. Lynn, *Toward Hierarchical Identity-Based Encryption*, to appear in ADVANCES IN CRYPTOGRAPHY—EUROCRYPT 2002, Lecture Notes in Computer Science. Springer. Horwitz and Lynn proposed a two-level hierarchical scheme with total collusion-resistance at the first level and partial collusion-resistance at the second level (i.e., users can collude to obtain the secret of their domain PKG and thereafter masquerade as that domain PKG). However, the complexity of the Horwitz-Lynn system increases with the collusion-resistance at the second level, and therefore that scheme cannot be both practical and secure.

Accordingly, there has been a need for a secure and practical hierarchical identity-based encryption scheme. It is therefore an object of the present invention to provide a secure and practical hierarchical identity-based encryption scheme. It is another object of the present invention to provide a secure and practical hierarchical identity-based signature scheme. It is a further object of the present invention that the encryption and signature schemes be fully scalable. It is a still further object of the present invention that the encryption and signature schemes have total collusion resistance on an arbitrary number of levels, and that they have chosen-ciphertext security in the random oracle model.

BRIEF SUMMARY OF THE PREFERRED EMBODIMENTS

In accordance with the present invention, methods are provided for implementing secure and practical hierarchical identity-based encryption and signature schemes.

According to one aspect of the present invention, a method is provided for encoding and decoding a digital message between a sender and a recipient in a system including a plurality of private key generators ("PKGs"). The PKGs include at least a root PKG and n lower-level PKG in the hierarchy between the root PKG and the recipient, wherein $n \geq 1$. A root key generation secret is selected and is known only to the root PKG. A root key generation parameter is generated based on the root key generation secret. A lower-level key generation secret is selected for each of the n lower-level PKGs, wherein each lower-level key generation secret is known only to its associated lower-level PKG. A lower-level key generation parameter also is generated for each of the n lower-level PKGs using at least the lower-level key generation secret for its associated lower-level private key generator. The message is encoded to form a ciphertext using at least the root key generation parameter and recipient identity information. A recipient private key is generated such that the recipient private key is related to at least the root key generation secret, one or more of the n lower-level key generation secrets associated with the n lower-level PKGs in the hierarchy between the root PKG and the recipient, and the recipient identity information. The ciphertext is decoded to recover the message using at least the recipient private key.

According to another aspect of the present invention, a method is provided for encoding and decoding a digital message between a sender and a recipient in a system including a plurality of private key generators ("PKGs"). The PKGs include at least a root PKG, m lower-level PKGs in the hierarchy between the root PKG and the sender, wherein $m \geq 1$, n lower-level PKG in the hierarchy between the root PKG and the recipient, wherein $n \geq 1$, and $PKG^l$, which is a common ancestor PKG to both the sender and the recipient. In the hierarchy, l of the m private key generators are common ancestors to both the sender and the recipient, wherein $l \geq 1$.

According to this aspect of the invention, a lower-level key generation secret is selected for each of the m lower-level PKGs in the hierarchy between the root PKG and the sender. A sender private key is generated such that the sender private key is related to at least the root key generation secret, one or more of the m lower-level key generation secrets associated with the m lower-level PKGs in the hierarchy between the root PKG and the sender, and sender identity information. A recipient private key is generated such that the recipient private key is related to at least the root key generation secret, one or more of the n lower-level key generation secrets associated with the n lower-level PKGs in the hierarchy between the root PKG and the recipient, and recipient identity information. The message is encoded using at least the recipient identity information, the sender private key, and zero or more of the lower-level key generation parameters associated with the (m−l+1) private key generators at or below the level of the common ancestor $PKG^l$, but not using any of the lower-level key generation parameters that are associated with the (l−1) PKGs above the common ancestor $PKG^l$. The message is decoded using at least the sender identity information, the recipient private key, and zero or more of the lower-level key generation parameters associated with the (n−l+1) private key generators at or below the level of the common ancestor $PKG_l$, but not using any of the lower-level key generation parameters that are associated with the (l−1) PKGs above the common ancestor $PKG_l$.

According to another aspect of the present invention, a method is provided for generating and verifying a digital signature of a message between a sender and a recipient in a system including a plurality of PKGs. The PKGs include at least a root PKG and n lower-level PKG in the hierarchy between the root PKG and the sender, wherein $n \geq 1$. A root key generation secret is selected and is known only to the root PKG. A root key generation parameter is generated based on the root key generation secret. A lower-level key generation secret is selected for each of the n lower-level PKGs, wherein each lower-level key generation secret is known only to its associated lower-level PKG. A lower-level key generation parameter also is generated for each of the n lower-level PKGs using at least the lower-level key generation secret for its associated lower-level private key generator. A private key is generated for the sender such that the private key is related to at least the root key generation secret and sender identity information. The message is signed to generate the digital signature using at least the sender private key. The digital message is verified using at least the root key generation parameter and the sender identity information.

BRIEF DESCRIPTION OF THE DRAWINGS

The subsequent description of the preferred embodiments of the present invention refers to the attached drawings, wherein.

DETAILED DESCRIPTION OF THE PREFERRED EMBODIMENTS

Figure 1:
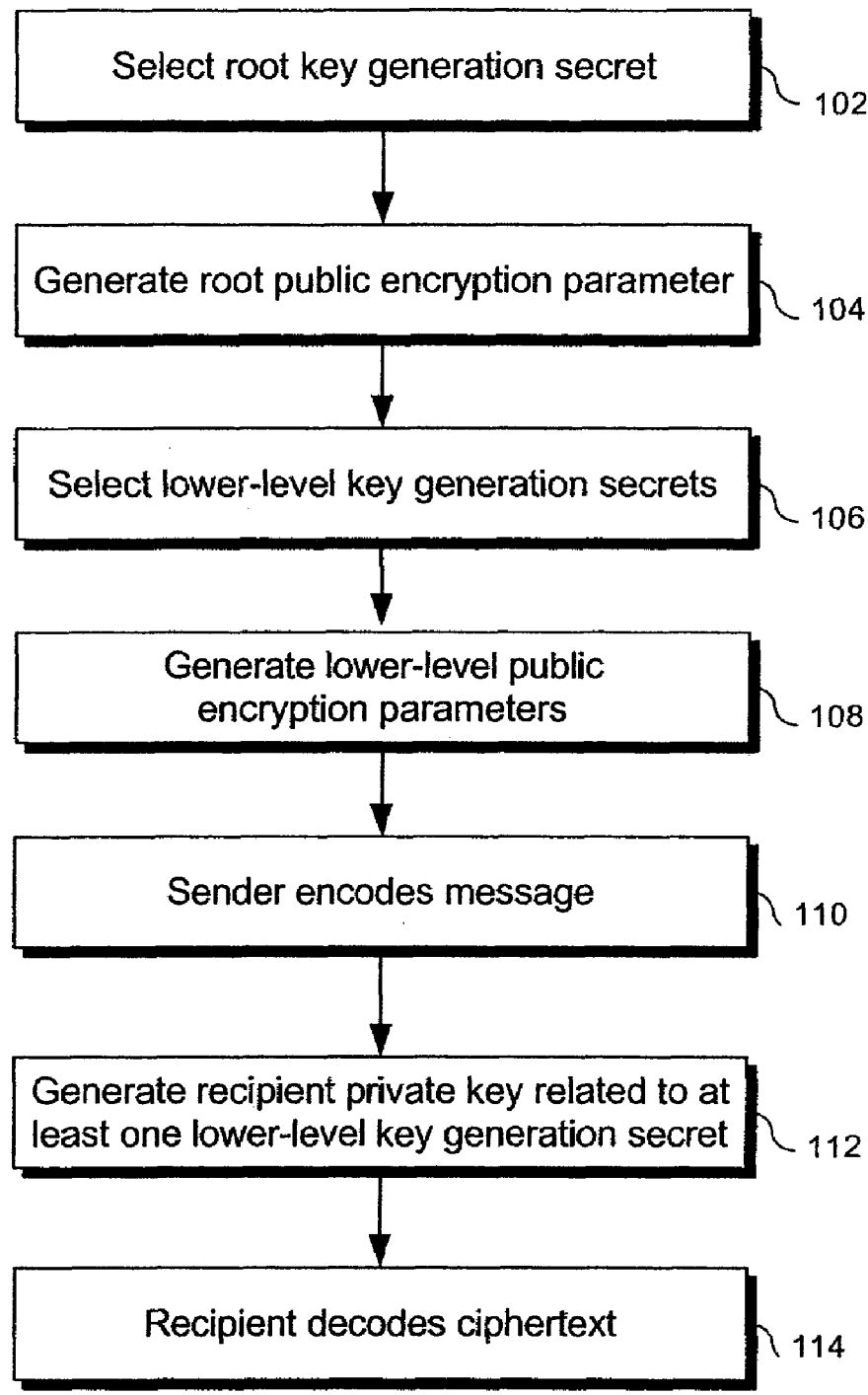
FIG. 1 shows a flow diagram illustrating a method of encoding and decoding a digital message according to one presently preferred embodiment of the invention.

The presently preferred methods of the invention provide secure and practical hierarchical identity-based encryption ("HIDE") and signature ("HIDS") schemes. The hierarchical schemes are fully scalable, have total collusion resistance on an arbitrary number of levels, and have chosen-ciphertext security in the random oracle model. These objectives are achieved, in part, by introducing additional random information at each of the lower-level PKGs. One intuitively surprising aspect of these schemes is that, even though lower level PKGs generate additional random information, this does not necessitate adding public parameters below the root level of the hierarchy. In addition, the random information generated by a lower-level PKG does not adversely affect the ability of users not under the lower-level PKG to send encrypted communications to users under the lower-level PKG.

Each of the HIDE and HIDS schemes of the present invention requires a hierarchical structure of PKGs, including at least one root PKG and a plurality of lower-level PKGs. The hierarchy and the lower-level PKGs may be logical or actual. For instance, a single entity may generate both a root key generation secret and the lower-level key generation secrets from which lower-level users' encryption or signature keys are generated. In this case, the lower-level PKGs are not separate entities, but are merely processes or information arranged in a logical hierarchy and used to generate keys for descendent PKGs and users in the hierarchy. Alternatively, each lower-level PKG may be a separate entity. Another alternative involves a hybrid of actual and logical lower-level PKGs. For purposes of this disclosure, the term "lower-level PKG" will be used generically to refer to any of these alternatives.

In the context of the hierarchical identity-based cryptosystems disclosed herein, identity-based public keys may be based on time periods. For instance, a particular recipient's identity may change with each succeeding time period. Alternatively, a recipient may arrange the time periods as children or descendents of itself in a hierarchy, and a sender would use the identity of the proper time period when encoding the message. Either way, each key may be valid for encrypting messages to Bob only during the associated time period.

The HIDE schemes of the present invention generally include five randomized algorithms: Root Setup, Lower-level Setup, Extraction, Encryption, and Decryption. Three of these algorithms rely upon the identities of the relevant entities in the hierarchy. Each user preferably has a position in the hierarchy that may be defined by its tuple of IDs: $(ID_1, \ldots, ID_t)$. The user's ancestors in the hierarchy are the root PKG and the users, or PKGs, whose ID-tuples are $\{(ID_1, \ldots, ID_i): 1 \leq i \leq (t-1)\}$. The ID-tuples preferably are represented as binary strings for purposes of computations.

In the Root Setup algorithm, the root PKG uses a security parameter k to generate public system parameters params and a root key generation secret. The system parameters include a description of the message space $\mathcal{M}$ and the ciphertext space $\mathcal{A}$. The system parameters will be publicly available, while only the root PKG will know the root key generation secret.

In the Lower-level Setup algorithm, each lower-level PKG preferably generates its own lower-level key generation secret for purposes of extraction. Alternatively, a lower-level PKG may generate random one-time secrets for each extraction.

In the Extraction algorithm, a PKG (whether the root PKG or a lower-level PKG) generates a private key for any of its children. The private key is generated using the system parameters, the generating PKG's private key, and any other preferred secret information.

In the Encryption algorithm, a sender receives the system parameters from the root PKG, preferably via some secure means outside the present system. It is not necessary for the sender to receive any of the lower-level key generation parameters. The sender encodes a message $M \in \mathcal{M}$ to generate a ciphertext $C \in \mathcal{A}$ using params and the ID-tuple of the intended recipient. Conversely, in the Decryption algorithm, the recipient decodes the ciphertext C to recover the message M using params and the recipient's private key d. Encryption and decryption preferably satisfy the standard consistency constraint:

$\forall M \in \mathcal{M}$: Decryption(params, d, C)=M where C=Encryption(params, ID-tuple, M).

Like the HIDE schemes, the HIDS schemes of the present invention also generally include five randomized algorithms: Root Setup, Lower-level Setup, Extraction, Signing, and Verification. For Root Setup, the system parameters are supplemented to include a description of the signature space $\mathcal{G}$. Lower-level Setup and Extraction preferably are the same as for HIDE, as described above.

In the Signing algorithm, the sender of a digital message signs the message $M \in \mathcal{M}$ to generate a signature $S \in \mathcal{G}$ using params and the sender's private key d. In the Verification algorithm, the recipient of the signed message verifies the signature S using params and the ID-tuple of the sender. The Verification algorithm preferably outputs "valid" or "invalid". Signing and Verification also preferably satisfies a consistency constraint:

$\forall M \in \mathcal{M}$: Verification(params, ID-tuple, S)="valid"

where S=Signing(params, d, M).

Security of HIDE and HIDS Schemes

The security of the schemes embodying the present invention will now be discussed with respect to both HIDE and HIDS. It has been noted in the context of non-hierarchical identity-based cryptography that the standard definition of chosen-ciphertext security must be strengthened for identity-based systems. This is because it should be assumed, for purposes of a security analysis, that an adversary can obtain the private key associated with any identity of its choice (other than the particular identity being attacked). The same applies to hierarchical identity-based cryptography. Accordingly, to establish that the HIDE schemes of the present invention are chosen-ciphertext secure, a simulated attacker is allowed to make private key extraction queries. Also, the simulated adversary is allowed to choose the identity on which it wishes to be challenged.

It should also be noted that an adversary may choose the identity of its target adaptively or nonadaptively. An adversary that chooses its target adaptively will first make hash queries and extraction queries, and then choose its target based on the results of these queries. Such an adversary might not have a particular target in mind when it begins the attack. Rather, the adversary is successful when it is able to hack somebody. A nonadaptive adversary, on the other hand, chooses its target independently from results of hash queries and extraction queries. For example, such an adversary might target a personal enemy. The adversary may still make hash queries and extraction queries, but its target choice is based strictly on the target's identity, not on the query results. Obviously, security against an adaptively-chosen-target adversary is the stronger, and therefore preferable, notion of security. However, the security analysis of the HIDE schemes in the present invention address both types of security.

A HIDE scheme is said to be semantically secure against adaptive chosen ciphertext and adaptive chosen target attack if no polynomially bounded adversary $\mathcal{IG}$ has a non-negligible advantage against the challenger in the following game:

SETUP: The challenger takes a security parameter k and runs the Root Setup algorithm. It gives the adversary the resulting system parameters params. It keeps the root key generation secret to itself.

PHASE 1: The adversary issues queries $q_1, \ldots, q_m$, where $q_i$ is one of:
1. Public-key query (ID-tuple$_i$): The challenger runs a hash algorithm on ID-tuple$_i$ to obtain the public key H (ID-tuple$_i$) corresponding to ID-tuple$_i$.
2. Extraction query (ID-tuple$_i$): The challenger runs the Extraction algorithm to generate the private key $d_i$ corresponding to ID-tuple$_i$, and sends $d_i$ to the adversary.
3. Decryption query (ID-tuple$_i$, $C_i$): The challenger runs the Extraction algorithm to generate the private key $d_i$ corresponding to ID-tuple$_i$, runs the Decryption algorithm to decrypt $C_i$ using $d_i$, and sends the resulting plaintext to the adversary.

These queries may be asked adaptively. In addition, the queried ID-tuple$_i$ may correspond to a position at any level of the hierarchy.

CHALLENGE: Once the adversary decides that Phase 1 is over, it outputs two equal-length plaintexts $M_0, M_1 \in \mathcal{M}$ and an ID-tuple on which it wishes to be challenged. The only constraints are that neither this ID-tuple nor its ancestors appear in any private key extraction query in Phase 1. The challenger picks a random bit $b \in \{0,1\}$ and sets C=Encryption(params, ID-tuple, $M_b$). It sends C as a challenge to the adversary.

PHASE 2: The adversary issues more queries $q_{m+1}, \ldots, q_n$ where $q_i$ is one of:
1. Public-key query (ID-tuple$_i$): The challenger responds as in Phase 1.
2. Extraction query (ID-tuple$_i$): The challenger responds as in Phase 1.
3. Decryption query (C, ID-tuple$_i$): The challenger responds as in Phase 1.

The queries in Phase 2 are subject to the constraint that the challenger cannot make an Extraction query on the ID-tuple associated with the challenge ciphertext C, or make a Decryption query using that ID-tuple and the ciphertext C. This same constraint also applies to all ancestors of the ID-tuple.

GUESS: The adversary outputs a guess b' $\in \{0,1\}$. The adversary wins the game if b=b'. The adversary's advantage in attacking the scheme is defined to be |Pr[b=b']−½|.

A HIDE schemes is said to be a one-way encryption scheme if no polynomial time adversary has a non-negligible advantage in the game described below. In this game, the adversary $\mathcal{IG}$ is given a random public key $K_{pub}$ and a ciphertext C that is the encryption of a random message M using $K_{pub}$, and outputs a guess for the plaintext. The adversary is said to have an advantage $\epsilon$ against the scheme if $\epsilon$ is the probability that $\mathcal{IG}$ outputs M. The game is played as follows:

SETUP: The challenger takes a security parameter k and runs the Root Setup algorithm. It gives the adversary the resulting system parameters params. It keeps the root key generation secret to itself.

PHASE 1: The adversary makes public key and/or extraction queries as in Phase 1 of the chosen-ciphertext security analysis described above.

CHALLENGE: Once the adversary decides that Phase 1 is over, it outputs a new ID-tuple ID on which it wishes to be challenged. The challenger picks a random M $\in \mathcal{M}$ and sets C=Encryption(params, ID-tuple, M). It sends C as a challenge to the adversary.

PHASE 2: The adversary issues more public-key queries and more extraction queries on identities other than ID and its ancestors, and the challenger responds as in Phase 1.

GUESS: The adversary outputs a guess M' $\in \mathcal{M}$. The adversary wins the game if M=M'. The adversary's advantage in attacking the scheme is defined to be Pr[M=M'].

The schemes of the present invention are secure against the challenges described above. In addition, the HIDS schemes of the present invention are secure against existential forgery on adaptively chosen messages. An adversary should be unable to forge its target's signature on other messages that the target has not signed previously, even after (adaptively) obtaining the target's signature on messages of the adversary's choosing. A HIDS adversary also will have the ability to make public key queries and private key extraction queries on entities other than the target and its ancestors, and the ability to choose its target. As with HIDE, the adversary's choice of target may be adaptive or nonadaptive.

Pairings

The presently preferred HIDE and HIDS schemes of the present invention are based on pairings, such as, for instance, the Weil or Tate pairings associated with elliptic curves or abelian varieties. The methods also are based on the Bilinear Diffie-Hellman problem. They use two cyclic groups $\mathcal{B}_1$ and $\mathcal{B}_2$, preferably of the same large prime order q. The first group $\mathcal{B}_1$ preferably is a group of points on an elliptic curve or abelian variety, and the group law on $\mathcal{B}_1$ may be written additively. The second group $\mathcal{B}_2$ preferably is a multiplicative subgroup of a finite field, and the group law on $\mathcal{B}_2$ may be written multiplicatively. However, other types of groups may be used as $\mathcal{B}_1$ and $\mathbb{G}_2$ consistent with the present invention.

The methods also use a generator $P_0$ of the first group $\mathbb{G}_1$. In addition, a pairing or function ê: $\mathcal{B}_1 \times \mathcal{B}_1 \to \mathcal{B}_2$ is provided for mapping two elements of the first group $\mathcal{B}_1$ to one element of the second group $\mathcal{B}_2$. The function ê preferably satisfies three conditions. First, the function ê preferably is bilinear, such that if Q and R are in $\mathcal{B}_1$ and a and b are integers, then ê(aQ, bR)=ê(Q, R)$^{ab}$. Second, the function ê preferably is non-degenerate, such that the map does not send all pairs in $\mathcal{B}_1 \times \mathcal{B}_1$ to the identity in $\mathcal{B}_2$. Third, the function ê preferably is efficiently computable. A function ê satisfying these three conditions is considered to be admissible.

The function ê also preferably is symmetric, such that ê(Q, R)=ê(R, Q) for all Q, R $\in \mathcal{B}_1$. Symmetry, however, follows immediately from the bilinearity and the fact that $\mathcal{B}_1$ is a cyclic group. Weil and Tate pairings associated with supersingular elliptic curves or abelian varieties can be modified to create such bilinear maps according to methods known in the art. However, even though reference to elements of the first cyclic group $\mathcal{B}_1$ as "points" may suggest that the function ê is a modified Weil or Tate pairing, it should be noted that any admissible pairing ê will work.

The security of the HIDE and HIDS schemes of the present invention is based primarily on the difficulty of the Bilinear Diffie-Hellman problem. The Bilinear Diffie-Hellman problem is that of finding ê(P, P)$^{abc}$ given a randomly chosen P $\in \mathcal{B}_1$, as well as aP, bP, and cP (for unknown randomly chosen a, b, c $\in \mathbb{Z}/q\mathbb{Z}$). Solving the Diffie-Hellman problem in $\mathcal{B}_1$ solves the Bilinear Diffie-Hellman problem because ê(P, P)$^{abc}$=ê(abP, cP). Similarly, solving the Diffie-Hellman problem in $\mathbb{G}_2$ solves the Bilinear Diffie-Hellman problem because, if g=ê(P, P), then g$^{abc}$=(g$^{ab}$)$^c$ where g$^{ab}$=ê(aP, bP) and g$^c$=ê(P, cP). For the Bilinear Diffie-Hellman problem to be hard, $\mathcal{B}_1$ and $\mathcal{B}_2$ should be chosen such that there is no known algorithm for efficiently solving the Diffie-Hellman problem in either $\mathcal{B}_1$ or $\mathcal{B}_2$. If the Bilinear Diffie-Hellman problem is hard for a pairing ê, then it follows that ê is non-degenerate.

A randomized algorithm $\rightarrow$ is a Bilinear Diffie-Hellman generator if $\rightarrow$ takes a security parameter k>0, runs in time polynomial in k, and outputs the description of two groups $\mathcal{B}_1$ and $\mathcal{B}_2$, preferably of the same prime order q, and the description of an admissible pairing ê: $\mathcal{B}_1 \times \mathcal{B}_1 \rightarrow \mathcal{B}_2$. If $\rightarrow$ is a Bilinear Diffie-Hellman parameter generator, the advantage $\text{Adv}\mathbb{Z}(\mathcal{C})$ that an algorithm $\mathcal{C}$ has in solving the Bilinear Diffie-Hellman problem is defined to be the probability that the algorithm $\mathcal{C}$ outputs $ê(P,P)^{abc}$ when the inputs to the algorithm are $\mathcal{B}_1$, $\mathcal{B}_2$, ê, P, aP, bP, and cP, where ($\mathcal{B}_1$, $\mathcal{B}_2$, ê) is the output of $\rightarrow$ for a sufficiently large security parameter k, P is a random generator of $\mathcal{B}_1$, and a, b, and c are random elements of $\mathbb{Z}/q\mathbb{Z}$. The assumption underlying the Bilinear Diffie-Hellman problem is that $\text{Adv}\rightarrow(\mathcal{C})$ is negligible for all efficient algorithms $\mathcal{C}$.

HIDE Schemes

Referring now to the accompanying drawings, FIG. 1 shows a flow diagram illustrating a method of encoding and decoding a digital message according to one presently preferred embodiment of the invention. The method is performed in a HIDE system including a plurality of PKGs. The PKGs include at least a root PKG and n lower-level PKGs in the hierarchy between the root PKG and the recipient, wherein $n \geq 1$.

In block 102, the root PKG selects a root key generation secret known only to the root PKG. The root key generation secret may be used to generate private keys for PKGs and/or users below the root PKG in the hierarchy. The root PKG then generates a root key generation parameter based on the root key generation secret in block 104. The root key generation parameter is used to mask the root key generation secret. The root key generation parameter may be revealed to lower-level PKGs without compromising the root key generation secret. The lower-level PKGs select lower-level key generation secrets in block 106. The lower-level key generation secret associated with a given lower-level PKG may be used to generate private keys for PKGs and/or users below the associated lower-level PKG in the hierarchy. Like the root key generation secret, each of the lower-level key generation secrets is known only to its associated lower-level PKG.

In block 108, lower-level key generation parameters are generated for each of the n lower-level PKGs. Each of the lower-level key generation parameters is generated using at least the lower-level key generation secret for its associated lower-level PKG. Like the root key generation parameter, each of the lower-level key generation parameters masks its associated lower-level key generation secret.

Using at least the root key generation parameter and identity information associated with the recipient, the sender encodes the message in block 110 to form a ciphertext. For instance, the message may be encoded using only the root key generation parameter and the recipient's identity. Alternatively, one of the lower-level key generation parameters may be used, such as is described in more detail below with respect to dual-HIDE schemes. In block 112, a lower-level PKG generates a private key for the recipient such that the private key is related to at least the root key generation secret, one or more of the n lower-level key generation secrets associated with the n lower-level PKGs in the hierarchy between the root PKG and the recipient, and the recipient's identity information. For instance, in addition to root key generation secret and the recipient's identity information, the recipient's private key preferably also is related at least to the lower-level key generation secret of the PKG that issued the private key to the recipient. Alternatively, the recipient's private key may be related to all n of its ancestral PKG's lower-level key generation secrets, as well as the root key generation secret. In block 114, the recipient uses at least its private key to decode the ciphertext and recover the message. In addition to using its private key to decode, the recipient preferably also uses the n lower-level key generation parameters associated with the n lower-level PKGs in the hierarchy between the root PKG and the recipient.

Each lower-level PKG has a key generation secret, just like the root PKG. As described above, a lower-level PKG preferably uses this secret to generate a private key for each of its children, just as the root PKG does. As a result, the children's private keys are related to the lower-level PKG's key generation secret. This is true even if the lower-level PKG uses a modified version of its key generation secret to obscure that secret for purposes of restricting key escrow, as described more fully below. At the same time, the lower-level PKGs need not always use the same secret for each private key extraction. Rather, a new key generation secret could be generated randomly for each of the PKG's children, resulting in a different key generation parameter for each child.

Because a lower-level PKG is able to generate a private key for the recipient (block 112), the root PKG need not generate all of the private keys itself. In addition, because the lower-level PKGs use their own key generation secrets to generate private keys for their descendants, compromising a lower-level key generation secret causes only limited security damage to the hierarchy. Rather than compromising all of the private keys in the hierarchy, a breach of a lower-level PKG compromises only the private key of that PKG and those private keys that were generated using that PKG's key generation secret (i.e., the private keys of those users that are direct hierarchical descendants of the compromised PKG).

Another advantage of this embodiment is that the sender need not be in the hierarchy to send an encoded message to the recipient. The sender merely needs to know the identity information associated with the recipient and the system parameters generated by the root PKG. There are however, certain additional advantages of the HIDE schemes of the present invention that become available when the sender is positioned within the hierarchy. For instance, when both the sender and the recipient are in the hierarchy, the efficiency of the message encryption may be improved by using the identities of both parties. This type of HIDE scheme may be referred to as dual-HIDE because the identities of both the sender and the recipient are used as input for the encryption and decryption algorithms. A method of encoding and decoding a message using a dual-HIDE scheme will now be discussed with reference to FIGS. 2 and 3.

Dual-HIDE

Figure 2:
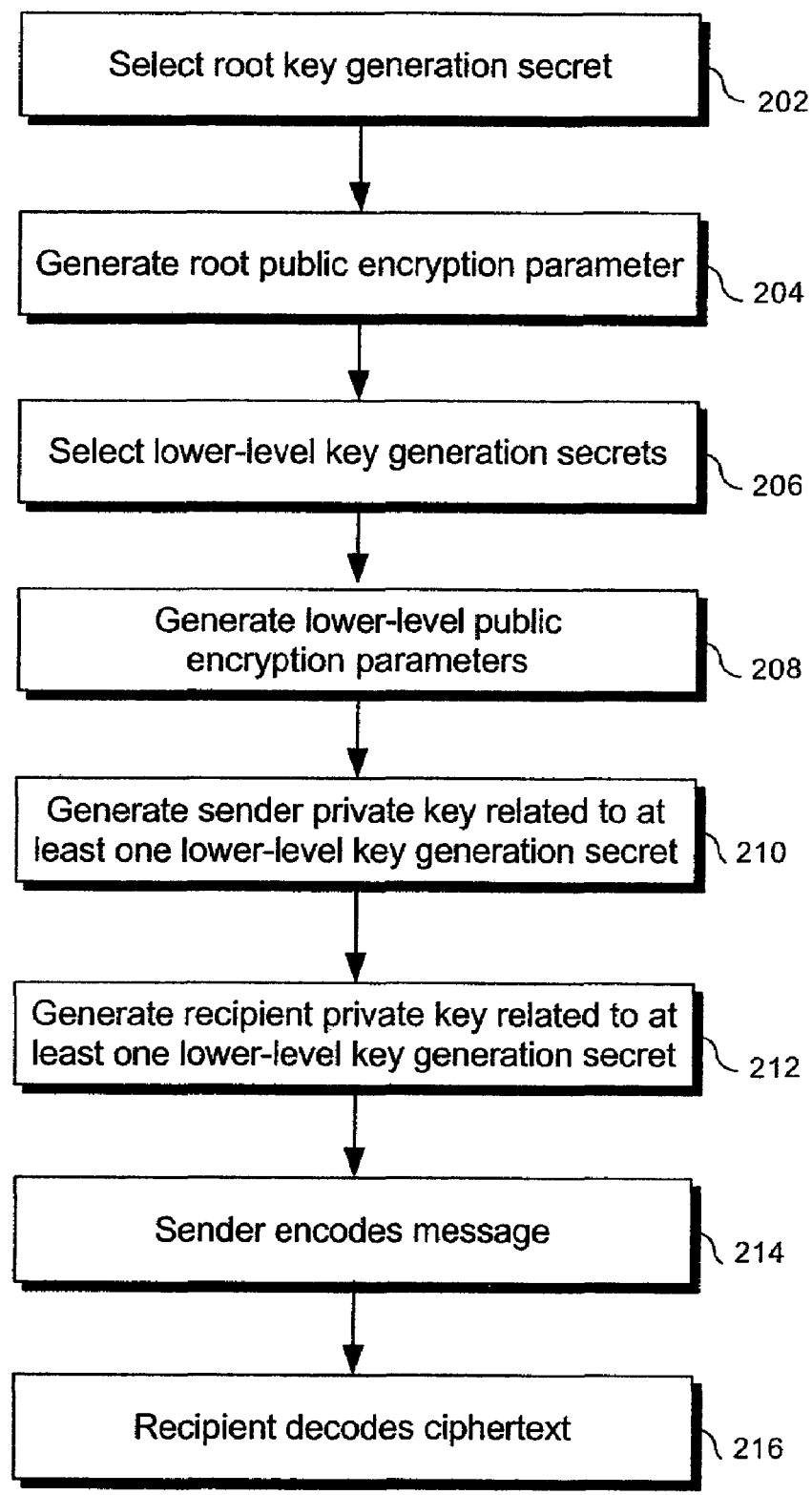
FIG. 2 shows a flow diagram illustrating a method of encoding and decoding a digital message between a sender y and a recipient z according to another presently preferred embodiment of the invention.
Figure 3:
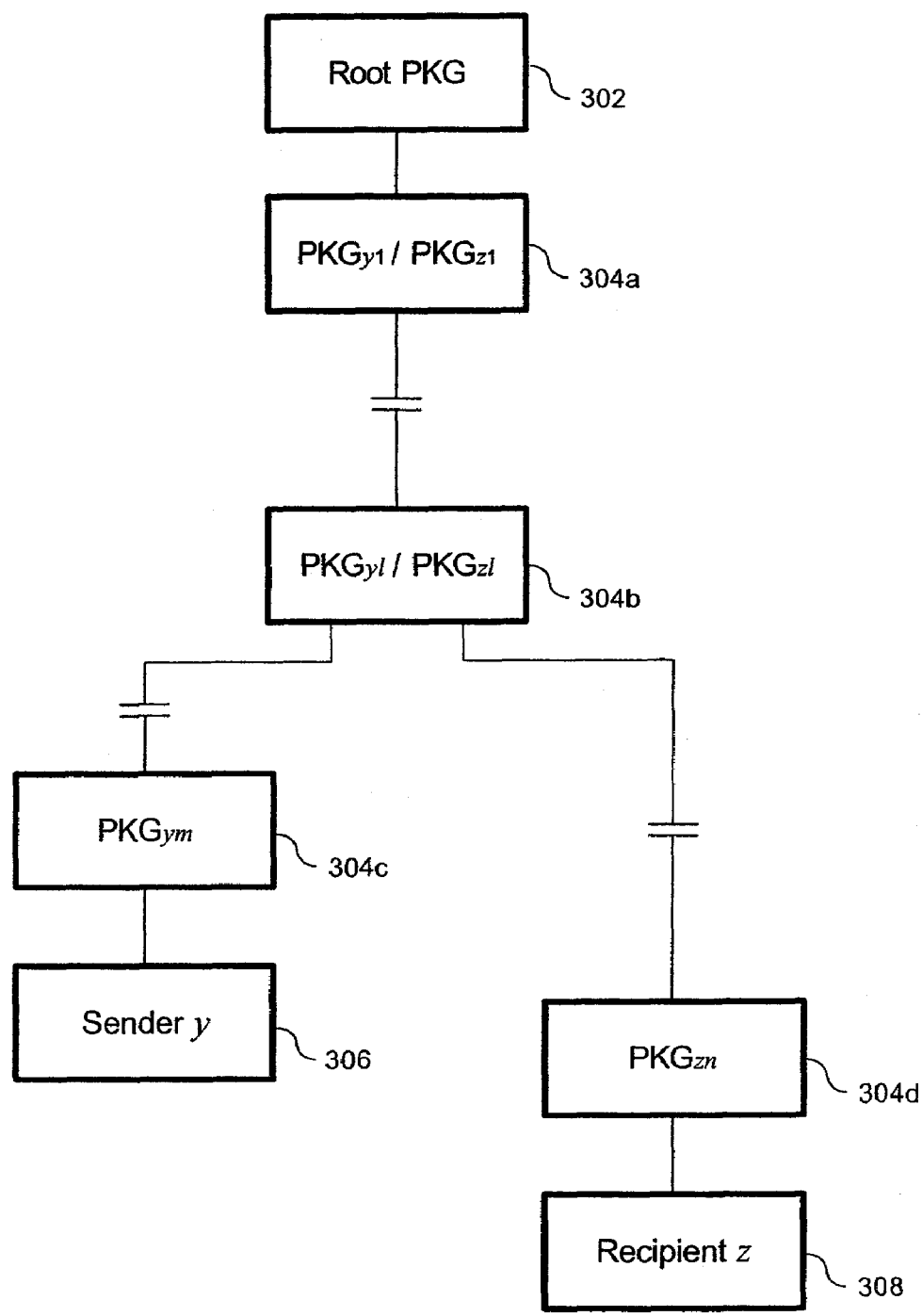
FIG. 3 shows a block diagram illustrating a typical hierarchical structure in which this method of FIG. 2 may be performed.

FIG. 2 shows a flow diagram illustrating a method of encoding and decoding a digital message between a sender y and a recipient z according to another presently preferred embodiment of the invention. FIG. 3 shows a block diagram illustrating a typical hierarchical structure in which this method may be performed. Like the previous embodiment, this method is performed in a HIDE system including at least a root PKG 302 and n lower-level PKGs 304*a,b,d* in the hierarchy between the root PKG 302 and the recipient z 308, wherein $n \geq 1$. The sender y 306 in this embodiment also must be in the hierarchy, and the hierarchy also includes m lower-level PKGs 304*a,b,c* between the root PKG 302 and the sender y 306, wherein m≧1. Of the m PKGs 304a,b,c between the root PKG 302 and the sender y 306, and the n PKGs 304a,b,d between the root PKG 302 and the recipient z 308, there are l PKGs 304a,b that are common ancestors to both the sender y 306 and the recipient z 308, wherein 1≦l≦m, n. For instance, two of these l common ancestral PKGs (PKG$_{y1}$/PKG$_{z1}$ 304a and PKG$_{yl}$/PKG$_{zl}$ 304b) are shown in FIG. 3.

The method of this embodiment begins in block 202, when the root PKG 302 selects a root key generation secret known only to the root PKG 302. The root PKG 302 then generates a root key generation parameter based on the root key generation secret in block 204. The lower-level PKGs 304a-d select lower-level key generation secrets in block 206. Like the root key generation secret, each of the lower-level key generation secrets is known only to its associated lower-level PKG 304a-d. In block 208, lower-level key generation parameters are generated for each of the n lower-level PKGs 304a-d. Each of the lower-level key generation parameters is generated using at least the lower-level key generation secret for its associated lower-level PKG 304a-d.

In block 210, the sender's parent PKG$_{ym}$ 304c generates a private key for the sender y 306 such that the private key is related to at least the root key generation secret, one or more of the m lower-level key generation secrets associated with the m lower-level PKGs 304a,b,c between the root PKG 302 and the sender y 306, and the sender's identity information. For instance, in addition to root key generation secret and the sender's identity information, the sender's private key preferably is related at least to the lower-level key generation secret of the sender's parent PKG$_{ym}$ 304c. Alternatively, the sender's private key may be related to all m of its direct ancestral PKGs' lower-level key generation secrets, as well as the root key generation secret. In block 212, the recipient's parent PKG$_{zn}$ 304d generates a private key for the recipient z in a similar manner that the sender's parent PKG$_{ym}$ 304c used to generate the sender's private key.

In block 214, the sender y encodes the message to form a ciphertext using at least the sender's private key and one or more of the lower-level key generation parameters associated with the (m–l+1) PKGs (i.e., PKG$_{yl}$ 304b and PKG$_{ym}$ 304c) between the root PKG 302 and the sender y 306 that are at or below the level of the lowest ancestor PKG (PKG$_{yl}$/PKG$_{zl}$ 304b) that is common to both the sender y 306 and the recipient z 308. In encoding the message, the sender y 306 preferably does not use any of the lower-level key generation parameters that are associated with the (l–1) PKGs (i.e., PKG$_{y1}$ 304a) that are above the lowest common ancestor PKG (PKG$_{yl}$/PKG$_{zl}$ 304b).

The recipient z 308 then decodes the ciphertext to recover the message in block 216 using at least the recipient's private key and one or more of the lower-level key generation parameters associated with the (n–l+1) PKGs (i.e., PKG$_{zl}$ 304b and PKG$_{zn}$ 304c) between the root PKG 302 and the recipient z 308 that are at or below the level of the lowest ancestor PKG (PKG$_{yl}$/PKG$_{zl}$ 304b) that is common to both the sender y 306 and the recipient z 308. In decoding the message, the recipient z 306 preferably does not use any of the lower-level key generation parameters that are associated with the (l–1) PKGs (i.e., PKG$_{z1}$ 304a) that are above the lowest common ancestor PKG (PKG$_{yl}$/PKG$_{zl}$ 304b).

This dual-HIDE embodiment of the invention provides a more efficient scheme for encoding and decoding the message because it requires the use of fewer key generation parameters. For instance, decoding in a regular HIDE scheme preferably requires all n of the key generation parameters, but decoding in a dual-HIDE scheme preferably requires only (n–l+1) of the key generation parameters. Dual-HIDE schemes require the sender y 306 to obtain its private key before sending an encoded message to the recipient z 308, as opposed to merely obtaining the public system parameters of the root PKG. The dual-HIDE schemes also enable the sender y 306 and the recipient z 308 to restrict the scope of key escrow, as described more fully below. This shared secret is unknown to third parties other than their lowest common ancestor PKG$_{yl}$/PKG$_{zl}$ 304b.

BasicHIDE

In some embodiments, the scheme is as follows. Let Level$_i$ be the set of entities at level i, where Level$_0$={Root PKG}. Let K be the security parameter given to the setup algorithm and let → be a BDH parameter generator.

Root Setup: The root PKG:
1. runs → on input K to generate groups $\mathcal{B}_1$, $\mathcal{B}_2$ of some prime order q and an admissible pairing ê: $\mathcal{B}_1 \times \mathcal{B}_1 \to \mathcal{B}_2$;
2. chooses an arbitrary generator $P_0 \in \mathcal{B}_1$;
3. picks a random $s_0 \in \mathbb{Z}/q\mathbb{Z}$ and sets $Q_0 = s_0 P_0$;
4. chooses cryptographic hash functions $H_1: \{0,1\}^* \to \mathcal{B}_1$ and $H_2: \mathcal{B}_2 \to \{0,1\}^n$ for some n. The security analysis will treat $H_1$ and $H_2$ as random oracles.

The message space is $\mathcal{M} = \{0,1\}^n$. The ciphertext space $\mathcal{A} = \mathcal{B}_1^t \times \{0,1\}^t$ where t is the level of the recipient. The system parameters are params={$\mathcal{B}_1, \mathcal{B}_2, \hat{e}, P_0, Q_0, H_1, H_2$}. The root PKG's secret is $s_0 \in \mathbb{Z}/q\mathbb{Z}$.

Lower-level Setup. Entity $E_t \in$ Level$_t$ picks a random $s_t \in \mathbb{Z}/q\mathbb{Z}$, which it keeps secret.

Extraction: Let $E_t$ be an entity in Level$_t$ with ID-tuple $(ID_1, \ldots, ID_t)$, where $(ID_1, \ldots, ID_i)$ for $1 \leq i \leq t$ is the ID tuple of $E_t$'s ancestor at Level$_i$. Set $S_0$ to be the identity element of $\mathcal{B}_1$. The $E_t$'s parent:
1. computes $P_t = H_1(ID_1, \ldots, ID_t) \in \mathcal{B}_1$;
2. sets $E_t$'s secret point $S_t$ to be $$S_{t-1} + s_{t-1} P_t = \sum_{i=1}^{t} s_{i-1} P_i;$$

3. also gives $E_t$ the values of $Q_i = s_i P_0$ for $1 \leq i \leq t-1$.

Encryption: To encrypt $M \in \mathcal{M}$ with the ID-tuple $(ID_1, \ldots, ID_t)$, do the following:
1. Compute $P_i = H_1(ID_1, \ldots, ID_i) \in \mathcal{B}_1$ for $1 \leq i \leq t$.
2. Choose a random $r \in \mathbb{Z}/q\mathbb{Z}$.
3. Set the ciphertext to be $$C = [rP_0, rP_2, \ldots, rP_t, M \oplus H_2(g^r)] \text{ where}$$
$$g = \hat{e}(Q_0, P_1) \in \mathcal{B}_2.$$

Decryption: Let $C = [U_0, U_2, \ldots, U_t, V] \in \mathcal{A}$ be the ciphertext encrypted using the ID-tuple $(ID_1, \ldots, ID_t)$. To decrypt C, $E_t$ computes:

$$V \oplus H_2 \left( \frac{\hat{e}(U_0, S_t)}{\prod_{i=2}^{t} \hat{e}(Q_{i-1}, U_i)} \right) = M.$$

This concludes the description of one embodiment of our BasicHIDE scheme.

Remark 1. Each lower-level PKG—say, in Level$_t$—has a secret $s_t \in \mathbb{Z}/q\mathbb{Z}$, just like the root PKG. A lower-level PKG uses this secret to generate a secret point for each of its children, just as the root PKG does. An interesting fact, however, is that lower-level PKGs need not always use the same $s_t$ for each private key extraction. Rather, $s_t$ could be generated randomly for each of the PKG's children.

Remark 2. $H_1$ can be chosen to be an iterated hash function so that, for example, $P_i$ may be computed as $H_1(P_{i-1}, ID_i)$ rather than $H_1(ID_1, \ldots, ID_i)$.

Figure 4:
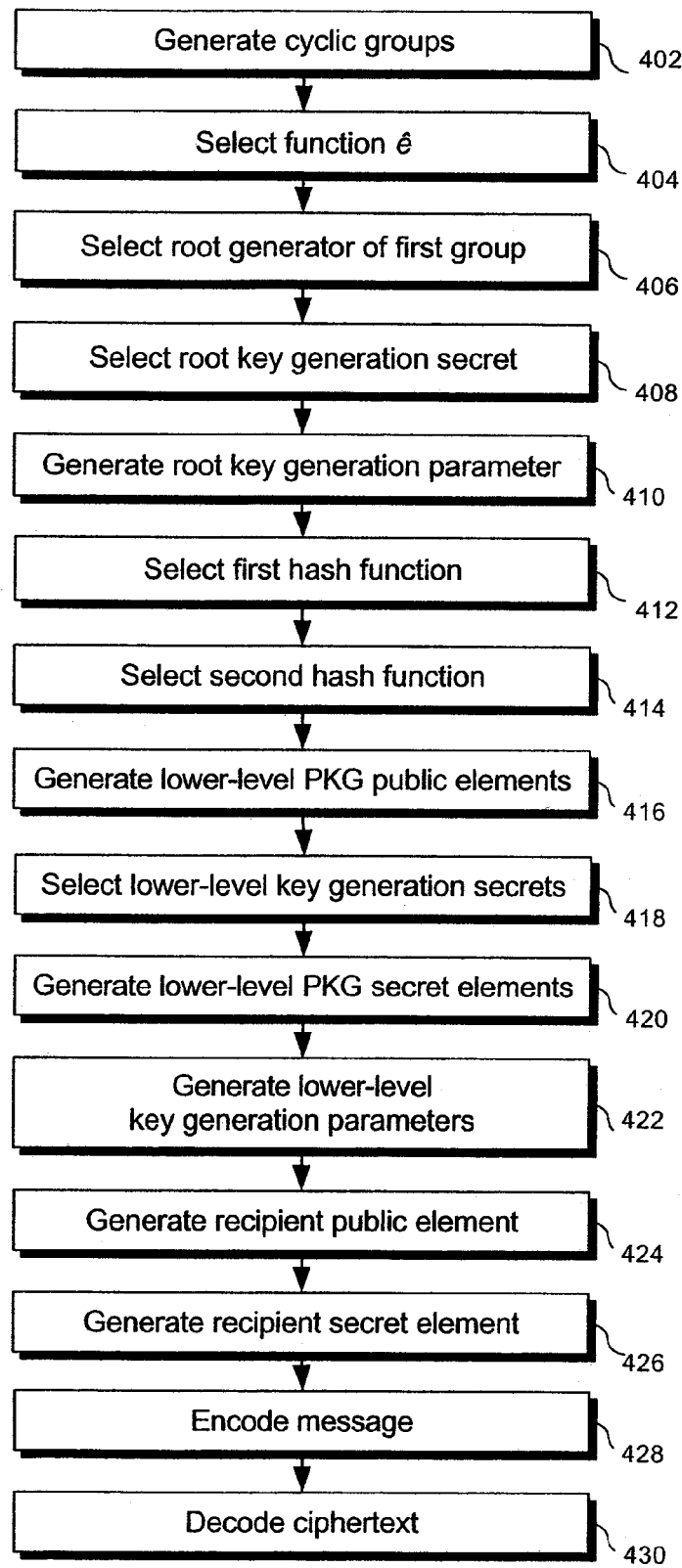
FIG. 4 shows a flow diagram illustrating a method of encoding and decoding a digital message M communicated between a sender y and a recipient z according to another presently preferred embodiment of the invention.

FIG. 4 shows a flow diagram illustrating a method of encoding and decoding a digital message M communicated between a sender y and a recipient z according to another presently preferred embodiment of the invention. The recipient z 308 is n+1 levels below the root PKG in the hierarchy, as shown in FIG. 3, and is associated with the ID-tuple $(ID_{z1}, \ldots, ID_{z(n+1)})$. The recipient's ID-tuple includes identity information $ID_{z(n+1)}$ associated with the recipient, as well as identity information $ID_{zi}$ associated with each of its n ancestral lower-level PKGs in the hierarchy. The method begins in block 402 by generating first and second cyclic groups $\mathcal{B}_1$ and $\mathcal{B}_2$ of elements. In block 404, a function ê is selected, such that the function ê is capable of generating an element of the second cyclic group $\mathcal{B}_2$ from two elements of the first cyclic group $\mathcal{B}_1$. The function ê preferably is an admissible pairing, as described above. A root generator $P_0$ of the first cyclic group $\mathcal{B}_1$ is selected in block 406. In block 408, a random root key generation secret $s_0$ associated with and known only to the root PKG 302 is selected. Preferably, $s_0$ is an element of the cyclic group $\mathbb{Z}/q\mathbb{Z}$. A root key generation parameter $Q_0 = s_0 P_0$ is generated in block 410. Preferably, $Q_0$ is an element of the first cyclic group $\mathbb{G}_1$. In block 412, a first function $H_1$ is selected such that $H_1$ is capable of generating an element of the first cyclic group $\mathcal{B}_1$ from a first string of binary digits. A second function $H_2$ is selected in block 414, such that $H_2$ is capable of generating a second string of binary digits from an element of the second cyclic group $\mathcal{B}_2$. The functions of blocks 402 through 414 are part of the HIDE Root Setup algorithm described above, and preferably are performed at about the same time. By way of example, the functions such as those disclosed in Boneh-Franklin may be used as $H_1$ and $H_2$.

The next series of blocks (blocks 416 through 424) show the functions performed as part of Lower-level Setup algorithm. In block 416, a public element $P_{zi}$ is generated for each of the recipients' n ancestral lower-level PKGs. Each of the public elements, $P_{zi} = H_1(ID_1, \ldots, ID_{zi})$ for $1 \leq i \leq n$, preferably is an element of the first cyclic group $\mathcal{B}_1$. Although represented in a single block, generation of all the public elements $P_{zi}$ may take place over time, rather than all at once.

A lower-level key generation secret $s_{zi}$ is selected (block 418) for each of the recipients' n ancestral lower-level PKGs 304a,b,d. The lower-level key generation secrets $s_{zi}$ preferably are elements of the cyclic group $\mathbb{Z}/q\mathbb{Z}$ for $1 \leq i \leq n$, and each lower-level key generation secret $s_{zi}$ preferably is known only to its associated lower-level PKG. Again, although represented in a single block, selection of all the lower-level key generation secrets $s_{zi}$ may take place over time, rather than all at once.

A lower-level secret element $S_{zi}$ is generated (block 420) for each of the sender's n ancestral lower-level PKGs. Each lower-level secret element, $S_{zi} = S_{z(i-1)} + s_{z(i-1)} P_{zi}$ for $1 \leq i \leq n$ preferably is an element of the first cyclic group $\mathcal{B}_1$. Although represented in a single block like the public elements $P_{zi}$ and the secrets $s_{zi}$, generation of all the secret elements $S_{zi}$ may take place over time, rather than all at once. For purposes of these iterative key generation processes, $S_0$ may be defined to be the identity element of $\mathbb{G}_1$.

A lower-level key generation parameter $Q_{zi}$ also is generated (block 422) for each of the recipients' n ancestral lower-level PKGs. Each of the key generation parameters, $Q_{zi} = s_{zi} P_0$ for $1 \leq i \leq n$, preferably is an element of the first cyclic group $\mathcal{B}_1$. Again, although represented in a single block, generation of all the key generation parameters $Q_{zi}$ may take place over time, rather than all at once.

The functions of the next two blocks (blocks 424 and 426) are performed as part of the Extraction algorithm described above. A recipient public element $P_{z(n+1)}$ associated with the recipient z is generated in block 424. The recipient public element, $P_{z(n+1)} = H_1(ID_{z1}, \ldots, ID_{z(n+1)})$, preferably is an element of the first cyclic group $\mathcal{B}_1$. A recipient secret element $S_{z(n+1)}$ associated with the recipient z is then generated in block 426. The recipient secret element $$S_{z(n+1)} = S_{zn} + s_{zn} P_{z(n+1)} = \sum_{i=1}^{n+1} s_{z(i-1)} P_{zi},$$

also preferably is an element of the first cyclic group $\mathcal{B}_1$.

For convenience, the first function $H_1$ optionally may be chosen to be an iterated function so that, for example, the public points $P_i$ may be computed as $H_1(P_{z(i-1)}, ID_{zi})$ rather than $H_1(ID_1, \ldots, ID_{zi})$.

The last two blocks shown in FIG. 4 (blocks 428 and 430) represent the Encryption and Decryption algorithms described above. In block 428, the message M is encoded to generate a ciphertext C. The encoding preferably uses at least the root key generation parameter $Q_0$ and the ID-tuple $(ID_{z1}, \ldots, ID_{z(n+1)})$. The ciphertext C is then decoded in block 430 to recover the message M. The decoding preferably uses at least the lower-level key generation parameters $Q_{zi}$ for $1 < i < n$, and the recipient secret element $S_{z(n+1)}$.

The blocks shown in FIG. 4 need not all occur in sequence. For instance, a sender who knows a recipient's identity may encrypt communications to the recipient before the recipient obtains its private key.

Figure 5:
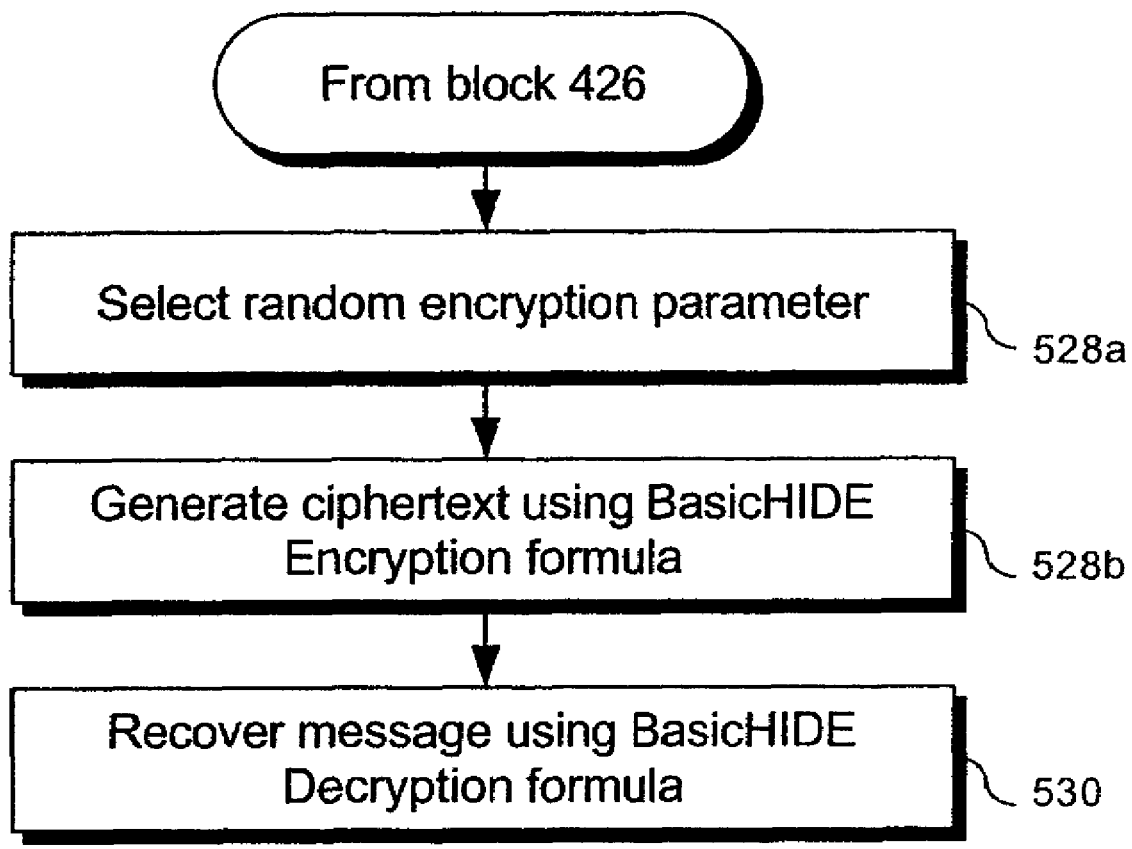
FIG. 5 shows a flow diagram illustrating a method of encoding and decoding a digital message M communicated between a sender y and a recipient z according to another presently preferred embodiment of the invention.

The specific use of the parameters and elements described above in the encoding and decoding of the message M and the ciphertext C will now be discussed with reference to FIGS. 5 and 6. FIG. 5 shows a flow diagram illustrating a method of encoding and decoding a digital message M communicated between a sender y and a recipient z according to another presently preferred embodiment of the invention. In this scheme, which may be referred to as BasicHIDE, the Root Setup, Lower-level Setup, and Extraction algorithms are the same as for the embodiment shown in blocks 402 through 426 of FIG. 4. The flow diagram of FIG. 5 illustrates the Encryption and Decryption algorithms, beginning with the selection of a random encryption parameter r in block 528a. Preferably, r is an integer of the cyclic group $\mathbb{Z}/q\mathbb{Z}$. The ciphertext C is then generated in block 528b using the formula $C = [U_0, U_2, \ldots, U_{n+1}, V]$. The ciphertext C includes elements $U_i = rP_{zi}$ for i=0 and for $2 \leq i \leq n+1$, which relate to the location of the recipient in the hierarchy. The other part of the ciphertext C is the actual message in encrypted form, $V = M \oplus H_2(g^r)$, wherein $g = ê(Q_0, P_{z1})$. The element g preferably is a member of the second cyclic group $\mathcal{B}_2$. After the message has been encoded, it may be decoded according to the BasicHIDE Decryption algorithm, in which the message M is recovered from the ciphertext C (block 530) using the formula $$M = V \oplus H_2\left(\frac{ê(U_0, S_{n+1})}{\prod_{i=2}^{n+1} ê(Q_{i-1}, U_i)}\right).$$

FullHIDE

It is known that Fujisaki-Okamato padding can be used to convert a basic IBE scheme to an IBE scheme that is chosen ciphertext secure in the random oracle model. In the same way, BasicHIDE can be converted to FullHIDE, a HIDE scheme that is chosen ciphertext secure in the random oracle model. Next we describe the scheme FullHIDE. One embodiment is as follows:

Setup: As in the BasicHIDE scheme, but in addition choose hash functions $H_3: \{0,1\}^n \times \{0,1\}^n \to \mathbb{Z}/q\mathbb{Z}$ and $H_4: \{0,1\}^n \to \{0,1\}^n$.

Extraction: As in the BasicHIDE scheme.

Encryption: To encrypt $M \in \mathcal{M}$ with the ID-tuple $(ID_1, \ldots, ID_t)$, do the following:
1. compute $P_i = H_1(ID_1, \ldots, ID_i) \in \mathcal{B}_1$ for $1 \leq i \leq t$,
2. choose a random $\sigma \in \{0,1\}_n$,
3. set $r = H_3(\sigma, M)$, and
4. set the ciphertext to be $$C = [rP_0, rP_2, \ldots, rP_t, \sigma \oplus H_2(g^r), M \oplus H_4(\sigma)]$$

where $g = \hat{e}(Q_0, P_1) \in \mathcal{B}_2$ as before.

Decryption: Let $C = [U_0, U_2, \ldots, U_t, V, W] \in \mathcal{A}$ be the ciphertext encrypted using the ID-tuple $(ID_1, \ldots, ID_t)$. If $(U_0, U_2, \ldots, U_t) \notin \mathcal{B}_1^t$, reject the ciphertext. To decrypt C, $E_t$ does the following:
1. computes $$V \oplus H_2\left(\frac{\hat{e}(U_0, S_t)}{\prod_{i=2}^{t} \hat{e}(Q_{i-1}, U_i)}\right) = \sigma,$$

2. computes $W \oplus H_4(\sigma) = M$,
3. sets $r = H_3(\sigma, M)$ and tests that $U_0 = rP_0$ and $U_i = rP_i$ for $i = 2, \ldots, t$. If not, it rejects the ciphertext.
4. outputs M as the decryption of C.

Note that M is encrypted as $W = M \oplus H_4(\sigma)$. This can be replaced by $$W = E_{H_4(\sigma)}(M)$$

where E is a semantically secure symmetric encryption scheme.

Using known methods for making one-way encryption schemes secure against chosen-ciphertext attacks, a BasicHIDE scheme may be converted to a FullHIDE scheme that is chosen ciphertext secure in the random oracle model. A FullHIDE scheme that is chosen ciphertext secure will now be discussed with reference to FIG. 6.

Figure 6:
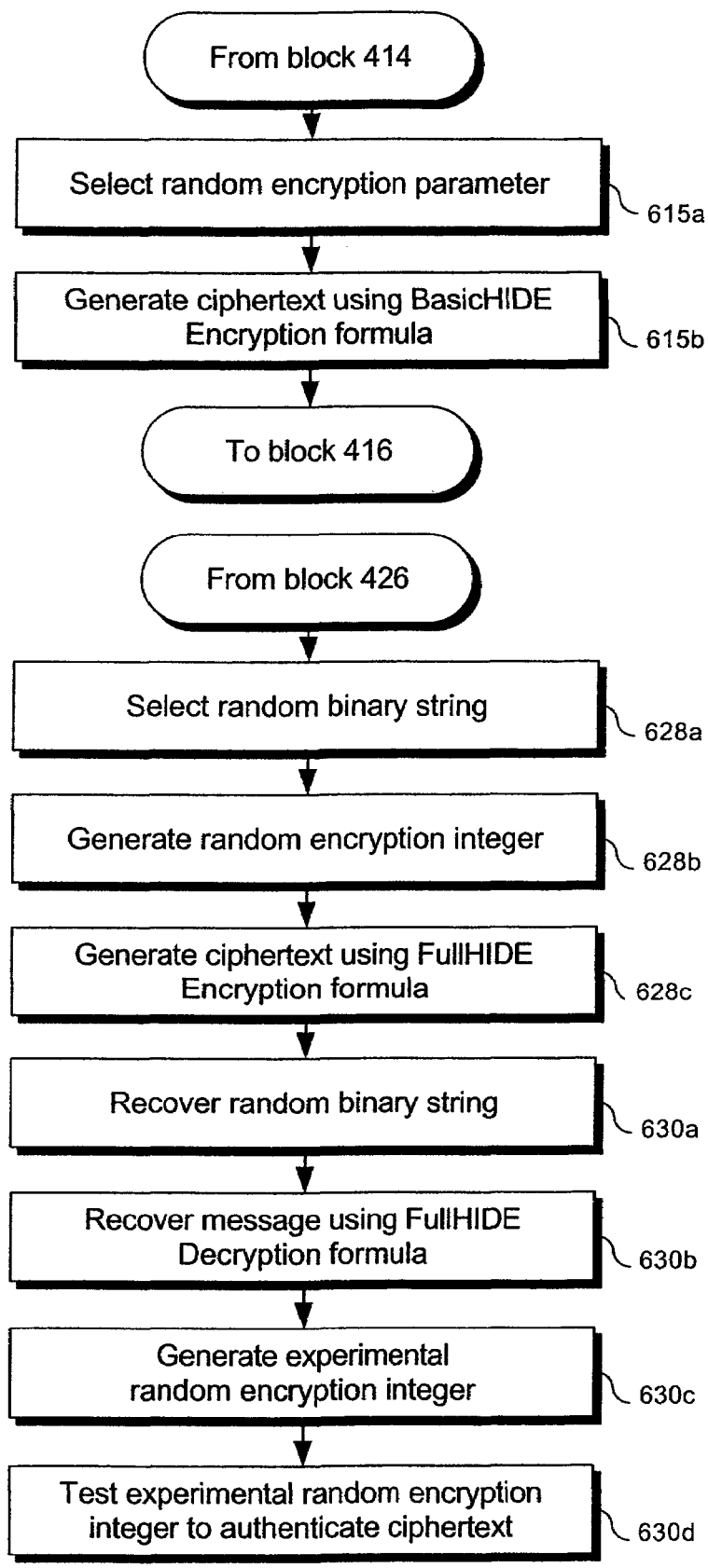
FIG. 6 shows a flow diagram illustrating a method of encoding and decoding a digital message M communicated between a sender y and a recipient z according to another presently preferred embodiment of the invention.

FIG. 6 shows a flow diagram illustrating a method of encoding and decoding a digital message M communicated between a sender y and a recipient z according to another presently preferred embodiment of the invention. The Root Setup, Lower-level Setup, and Extraction algorithms are the same for this embodiment of the invention as for the embodiment described with reference to FIG. 4, except that the Root Setup algorithm of this embodiment requires two additional functions. Accordingly, the flow diagram of FIG. 6 begins with the selection of the additional functions (blocks 615a and 615b) and continues with the Encryption and Decryption algorithms (blocks 628a through 630d).

The Root Setup algorithm is completed by selecting a third function $H_3$ (block 615a) and a fourth function $H_4$ (block 615b). The third function $H_3$ preferably is capable of generating an integer of the cyclic group $\mathbb{Z}/q\mathbb{Z}$ from two strings of binary digits. The fourth function $H_4$ preferably is capable of generating one binary string from another binary string.

The Encryption algorithm begins with block 628a, which shows the selection of a random binary string $\sigma$. The random binary string $\sigma$ is then used to generate a random integer $r = H_3(\sigma, M, W)$, as shown in block 628b, wherein W is a symmetric encryption of the actual message M. The encryption preferably is generated using a symmetric encryption algorithm E, and using $H_4(\sigma)$ as the encryption key. Accordingly, $W = E_{H_4(\sigma)}(M)$. In block 628c, the ciphertext $C = [U_0, U_2, \ldots, U_{n+1}, V, W]$ is generated. The ciphertext C includes elements $U_i = rP_{zi}$ for $i = 0$ and for $2 \leq i \leq n+1$, which relate to the location of the recipient in the hierarchy. The second part of the ciphertext C is the random binary string $\sigma$ in encrypted form, $V = \sigma \oplus H_2(g^r)$, wherein $g = \hat{e}(Q_0, P_{z1})$. The element g preferably is a member of the second cyclic group $\mathcal{B}_2$. The third part of the ciphertext C is W, the actual message in symmetrically encrypted form, as described above.

The Decryption algorithm begins with block 630a, which shows the recovery of the random binary string $\sigma$. The random binary string $\sigma$ is recovered using the formula $$\sigma = V \oplus H_2\left(\frac{\hat{e}(U_0, S_{z(n+1)})}{\prod_{i=2}^{n+1} \hat{e}(Q_{i-1}, U_i)}\right).$$

The message M is then recovered from the ciphertext C (block 630b) using the formula $M = E_{H_4(\sigma)}^{-1}(W)$. The ciphertext optionally may be checked for internal consistency. For instance, an experimental random integer $r' = H_3(\sigma, M, W)$ may be generated, as shown in block 630c. The experimental random integer r' then may be used in block 630d to confirm that $U_0 = r'P_0$ and $U_i = r'P_{zi}$ for $2 \leq i \leq n+1$. If so, then the ciphertext C is considered to be authentic.

Dual-BasicHIDE and Dual-FullHIDE

In 2000, Sakai, Ohgishi and Kasahara presented a "key sharing scheme" based on the Weil pairing. The idea was quite simple: suppose a PKG has a master secret s, and it issues private keys to users of the form $sP_y$, where $P_y = H_1(ID_y)$ and $ID_y$ is the ID of user y (as in Boneh-Franklin). Then users y and z have a shared secret that only they (and the PKG) may compute, namely $\hat{e}(sP_y, P_z) = \hat{e}(P_y, sP_z)$. They may use this shared secret to encrypt their communications. Notice that this "key sharing scheme" does not require any interaction between the parties. We can view Sakai, Ohgishi and Kasahara's discovery as a type of "dual-identity-based encryption," where the word "dual" indicates that the identities of both the sender and the recipient (rather than just the recipient) are required as input into the encryption and decryption algorithms. The only significant practical difference between this scheme and the Boneh-Franklin IBE scheme is that the sender must obtain its private key from the PKG before sending encrypted communications, as opposed to merely obtaining the public parameters of the PKG.

In the non-hierarchical context, Dual-IBE does not appear to have any substantial advantages over IBE. In the hierarchical context, however, Dual-HIDE may be more efficient than HIDE if the sender and recipient are close to each other in the hierarchy tree. Suppose two users, y and z, have the ID-tuples $(ID_{y1}, \ldots, ID_{yl}, \ldots, ID_{ym})$ and $(ID_{z1}, \ldots, ID_{zl}, \ldots, ID_{zn})$, where $(ID_{y1}, \ldots, ID_{yl}) = (ID_{z1}, \ldots, ID_{zl})$. In other words, user y is in Level$_m$, user z is in Level$_n$, and they share a common ancestor in Level$_l$. User y may use Dual-HIDE to encrypt a message to user z as follows:

Encryption: To encrypt M∈$\mathcal{M}$, user y:
1. Computes $P_{zi}=H_1(ID_{z1},\ldots,ID_{zi})\in \mathcal{B}_1$ for $l+1\leq i\leq n$.
2. Chooses a random $r\in \mathbb{Z}/q\mathbb{Z}$.
3. Set the ciphertext to be:

$$C=[rP_0, rP_{z(l+1)},\ldots,rP_{zn}, M\oplus H_2(g_{yl}^r)]$$

where $$g_{yl} = \frac{\hat{e}(P_0, S_y)}{\prod_{i=l+1}^{m} \hat{e}(Q_{y(i-1)}, U_i)} = \hat{e}(P_0, S_{yl}),$$

$S_y$ is y's secret point, $S_{yl}$ is the secret point of y's and z's common ancestor at level l, and $Q_{yi}=s_{yi}P_0$ where $s_{yi}$ is the secret number chosen by y's ancestor at level i.

Decryption: Let $C=[U_0, U_{l+1},\ldots,U_n, V]$ be the ciphertext. To decrypt C, user z computes:

$$V \oplus H_2\left(\frac{\hat{e}(U_0, S_z)}{\prod_{i=l+1}^{n} \hat{e}(Q_{z(i-1)}, U_i)}\right) = M.$$

Note that if y and z have a common ancestor below the root PKG, then the ciphertext is shorter with Dual-HIDE than with non-dual HIDE. Further, using Dual-HIDE, the encrypter y computes m−l+1 pairings while the decryptor z computers n−l+1 pairings. (Note that m+n−2l is the "length" of the path between y and z in the hierarchy tree.) In the non-dual HIDE scheme, the encrypter computes one pairing (or receives it as a per-computer value) while the decrypter computers n pairings. Thus when m<2l−1, the total work is less with Dual-HIDE than with non-dual HIDE. The relative computing power of the sender and recipient can also be taken into account.

The number of pairings that y and z must compute can be decreased to m+n−2l+1 if their common ancestor in Level$_l$ always uses the same $s_l$ rather than generating this number randomly with each private key extraction. Encryption and decryption proceed as follows:

Encryption: To encrypt M∈$\mathcal{M}$, user y:
1. Computes $P_{zi}=H_1(ID_{z1},\ldots,ID_{zi})\in \mathcal{B}_1$ for $l+1\leq i\leq n$.
2. Chooses a random $r\in \mathbb{Z}/q\mathbb{Z}$.
3. Set the ciphertext to be:

$$C=[rP_0, r(P_{z(l+1)}-P_{z(l+1)}), rP_{z(l+2)},\ldots, rP_{zn}, M\oplus H_2(g_{y(l+1)}^r)]$$

where $$g_{y(l+1)} = \frac{\hat{e}(P_0, S_y)}{\prod_{i=l+2}^{m} \hat{e}(Q_{y(i-1)}, P_{yi})} = \hat{e}(P_0, S_{y(l+1)}),$$

where $S_y$ is y's secret point and $S_{y(l+1)}$ is the secret point of y's ancestor at level l+1.

Decryption: Let $C=[U_0, U_{l+1},\ldots,U_n, V]$ be the ciphertext. To decrypt C, user z computes:

$$V \oplus H_2\left(\frac{\hat{e}(U_0, S_z)\hat{e}(U_{l+1}, Q_{zl})}{\prod_{i=l+2}^{n} \hat{e}(Q_{z(i-1)}, U_i)}\right) = M.$$

The concept of dual-HIDE described with reference to FIGS. 2 and 3 may be applied to BasicHIDE and FullHIDE schemes. When both the sender and recipient are within the hierarchical structure, as shown in FIG. 3, dual-HIDE allows them to increase the efficiency and security of their encrypted communications. The application of dual-HIDE to BasicHIDE and FullHIDE schemes requires the determination of additional information, most of which is determined via the Lower-level Setup algorithm described above. For instance, public elements $P_{yi}$, lower-level key generation secrets $s_{yi}$, lower-level secret elements $S_{yi}$, and lower-level key generation parameters $Q_{yi}$ must be determined for the sender's m ancestral lower-level PKGs. Note, however, that for the lower-level PKGs that are common ancestors to both the sender y and the recipient z, these parameters preferably will be the same for purposes of analyzing both the sender y and the recipient z (i.e., preferably for all $i\leq l: P_{yi}=P_{zi}$, $s_{yi}=s_{zi}$, $S_{yi}=S_{zi}$, and $Q_{yi}=Q_{zi}$). Dual-HIDE also requires determination of a sender public element $P_{y(m+1)}$ and a sender secret element $S_{y(m+1)}$ for the sender, using the same methods for which these parameters are determined for the recipient as described above.

Given these additional parameters, a message M may be encoded to generate a ciphertext C according the principles of dual-HIDE by using the lower-level key generation parameters $Q_{yi}$ for $i\geq 1$ and the sender secret element $S_{y(m+1)}$, but not using the lower-level key generation parameters $Q_{yi}$ for $i<l$. Similarly, the ciphertext C may be decoded to recover the message M using the lower-level key generation parameters $Q_{zi}$ for $i\geq 1$ and the recipient secret element $S_{z(n+1)}$, but not using the lower-level key generation parameters $Q_{zi}$ for $i<l$.

For instance, in a BasicHIDE scheme (FIGS. 4 and 5), application of dual-HIDE changes the encoding of the message M to generate a ciphertext $C=[U_0, U_{l+1},\ldots, U_{n+1}, V]$, wherein $U_i=rP_{zi}$ for $i=0$ and for $l+1\leq i\leq n+1$, wherein $V=M\oplus H_2(g_{yl}^r)$, and wherein $$g_{yl} = \frac{\hat{e}(P_0, S_{y(m+1)})}{\prod_{i=l+1}^{m+1} \hat{e}(Q_{y(i-1)}, P_{yi})}.$$

The $U_i$ factors are calculated in the same way as before, but fewer of them are necessary. However, dual-BasicHIDE does require the sender y to use more key generation parameters $Q_{yi}$ to generate $g_{yl}$ than are necessary to generate g as describe above. This is because the sender's identity is being incorporated into the Encryption algorithm.

The increase in efficiency of the Decryption algorithm is more dramatic. The message M is recovered using $$M = V \oplus H_2\left(\frac{\hat{e}(U_0, S_{z(n+1)})}{\prod_{i=l+1}^{n+1} \hat{e}(Q_{z(i-1)}, U_{zi})}\right).$$

Again, fewer $U_i$ parameters are necessary. Similarly, the recipient requires fewer key generation parameters $Q_{zi}$ for dual-HIDE than would otherwise be necessary.

FullHIDE also may be modified to create a dual-FullHIDE scheme. Generation of the ciphertext C in the Encryption algorithm is modified such that $C=[U_0, U_{l+1}, \ldots, U_{n+1}, V, W]$, wherein $U_i = rP_{zi}$ for i=0 and for $l+1 \leq i \leq n+1$. The W and r parameters is still generated the same way, $W = E_{H_4(\sigma)}(M)$, and the $g_{yl}$ parameter in $V = \sigma \oplus H_2(g_{yl}{}^r)$ is generated using $$g_{yl} = \frac{\hat{e}(P_0, S_{y(m+1)})}{\prod_{i=l+1}^{m+1} \hat{e}(Q_{y(i-1)}, P_{yi})}.$$

The Decryption algorithm also is modified in a dual-Full-HIDE scheme. The random binary string σ is recovered using $$\sigma = V \oplus H_2\left(\frac{\hat{e}(U_0, S_{z(n+1)})}{\prod_{i=l+1}^{n+1} \hat{e}(Q_{z(i-1)}, U_{zi})}\right).$$

Otherwise, recovery of the message M does not change.

Although these dual-HIDE schemes have been described using $PKG_l$ 304b as the lowest ancestor PKG common to both the sender y and the recipient z, $PKG_l$ 304b may be any common ancestor PKG. The encryption and decryption algorithms are the same. For maximum efficiency however, it is preferable that $PKG_l$ 304b be the lowest common ancestor PKG.

In addition to the increase in efficiency, the dual-HIDE schemes of the present invention also offer increased security by restricting key escrow. In the BasicHIDE and FullHIDE schemes described above, all of the recipient's direct ancestor PKGs are able to decrypt messages to the recipient. However, because the dual-HIDE schemes incorporate the key generation secret of $PKG_{l-1}$ (the immediate parent of $PKG_l$), which is unknown to the common ancestor PKGs above $PKG_{l-1}$, those common ancestor PKGs are not able to decrypt messages between the sender y and the recipient z. The immediate parent of $PKG_l$ 304b is still able to decrypt messages, however, because it knows its own key generation secret.

Key escrow may be further restricted such that even the immediate parent of $PKG_l$ may not decrypt messages between the sender y and the recipient z. This may be accomplished by obscuring $PKG_l$'s private key in the process of generating private keys for the sender y and the recipient z (or private keys for children of $PKG_l$ that are ancestors of the sender y and the recipient z). For instance, $PKG_l$ 304b may easily change its private key by setting $S_l' := S_l + bP_l$, and $Q_{l-1}' := Q_{l-1} + bP_0$, for some random $b \in \mathbb{Z}/q\mathbb{Z}$. The new private key $S_l'$ is just as effective, but is unknown to $PKG_l$'s immediate parent. Accordingly, no PKGs above $PKG_l$ are able to decode messages encrypted to the recipient z. More specifically, only ancestors of the recipient z that are within $PKG_l$'s domain are able to decrypt messages to the recipient z.

When $PKG_l$ 304b changes its private key by setting $S_l' := S_l + bP_l$, and $Q_{l-1}' := Q_{l-1} + bP_0$, the new private key is still related to $PKG_{l-1}$'s key generation secret $s_{l-1}$, because the new private key is derived from a private key generated by $PKG_{l-1}$ using $s_{l-1}$. In general, in all of the schemes discussed herein, a user or PKG may change its own secret element $S_{z(n+1)}$ and key generation parameters $Q_{zi}$ for $1 \leq i \leq n$ by choosing values for $b_i$ for $1 \leq i \leq n$ and setting $$S'_{z(n+1)} := S_{z(n+1)} + \sum_{i=1}^{n} b_i P_{z(i+1)}$$

and $Q_{zi}' := Q_{zi} + b_i P_0$ for $1 \leq i \leq n$. For purposes of the present invention, however, this new private key is still considered to be related to the original private key, and is thus related to the original values of the key generation secrets $s_{zi}$.

Dual-HIDE Scheme With More Efficient Encryption or Decryption

In the dual-HIDE schemes described above, it is possible to decrease by one the number of values of the pairing that the encrypter must compute without increasing the number of values of the pairing that the decrypter must compute. For instance, the dual-BasicHIDE Encryption algorithm described above may be modified such that the ciphertext $C = [rP_0, r(P_{y(l+1)} - P_{z(l+1)}), rP_{z(l+2)}, \ldots, rP_{z(n+1)}, M \oplus H_2(g_{y(l+1)}{}^r)]$, where $$g_{y(l+1)} = \frac{\hat{e}(P_0, S_{y(n+1)})}{\prod_{i=l+2}^{m} \hat{e}(Q_{y(i-1)}, P_{yi})} = \hat{e}(P_0, S_{y(l+1)}).$$

If the ciphertext is represented as $C = [U_0, U_{l+1}, \ldots, U_{n+1}, V]$, then it may be decrypted using $$M = V \oplus H_2\left(\frac{\hat{e}(U_0, S_{z(n+1)})\hat{e}(U_{l+1}, Q_{zl})}{\prod_{i=l+2}^{n} \hat{e}(Q_{z(i-1)}, U_i)}\right).$$

Likewise, it is possible to decrease by one the number of values of the pairing that the decrypter must compute without increasing the number of values that the encrypter must compute. For instance, the dual-BasicHIDE Encryption algorithm may be modified such that the ciphertext $C = [rP_0, rP_{y(l+2)}, \ldots, rP_{y(n)}, M \oplus H_2(g_{z(l+1)}{}^r)]$, where $$g_{z(l+1)} = \frac{\hat{e}(P_0, S_{y(m+1)})\hat{e}(Q_{yl}, (P_{z(l+1)} - P_{y(l+1)}))}{\prod_{i=l+2}^{m} \hat{e}(Q_{y(i-1)}, P_{yi})} = \hat{e}(P_0, S_{z(l+1)}).$$

If the ciphertext is represented as $C = [U_0, U_{l+2}, \ldots, U_n, V]$, then it may be decrypted using $$M = V \oplus H_2\left(\frac{\hat{e}(U_0, S_{z(n+1)})}{\prod_{i=l+2}^{n} \hat{e}(Q_{z(i-1)}, U_i)}\right).$$

Authenticated Lower-Level Root PKGs

The efficiencies of the dual-HIDE schemes described above may be extended to message senders who are outside the hierarchy by creating an authenticated lower-level root PKG. To "authenticate" the lower-level PKG, the root PKG may issue an additional parameter, such as a random message M'. The lower-level PKG then "signs" M', generating the signature $\text{Sig} = S_{zl} + s_{zl} P_{M'}$, where $S_l$ is the lower-level PKG's private key, and $s_t$ is its lower-level key generation secret. The lower-level PKG also publishes $Q_i$ for $1 \leq i \leq t$.

Taking advantage of the authenticated lower-level root PKG, a sender outside the hierarchy may send an encrypted message to the recipient z without computing public elements $P_{zi}$ for all n of the recipient's ancestor PKGs. Rather, the sender may use the parameters for the lower-level authenticated root PKG to encrypt the message more efficiently. In particular, the sender computes $P_{zi}=H_1(ID_1, \ldots, ID_{zi}) \in \mathcal{B}_1$ for $l+1 \leq i \leq n+1$. The sender then chooses a random $r \in \mathbb{Z}/q\mathbb{Z}$, and generates the ciphertext $C=[rP_0, rP_{z(l+1)}, \ldots, rP_{z(n+1)}, M \oplus H_2(g_{zl}^r)]$, where $$g_{zl} = \frac{\hat{e}(P_0, Sig)}{\hat{e}(s_{zl}P_0, P_{M'})} = \hat{e}(P_0, S_{zl}).$$

Letting the received ciphertext $C=[U_0, U_{l+1}, \ldots, U_{n+1}, V]$, the recipient may then decrypt the ciphertext to recover the message $$M = V \oplus H_2 \left[ \frac{\hat{e}(U_0, S_{z(n+1)})}{\prod_{i=l+1}^{n+1} \hat{e}(Q_{z(i-1)}, U_i)} \right],$$

where $S_{z(n+1)}$ is the recipient's private key.

Distributed PKGs

To further protect the key generation secrets of the HIDE schemes described above, and to make the schemes robust against dishonest PKGs, the key generation secrets and private keys may be distributed using known techniques of threshold cryptography.

More Efficient Encryption

The efficiency of encryption for the HIDE schemes described above may be increased by merging the highest two levels of the hierarchy into a single root PKG. In that case, $g=\hat{e}(Q_0, P_1)$ is included in the system parameters. This saves encrypters the task of computing the value of this pairing. However, the decrypters must compute one extra pairing (as a result of being one level lower down the tree).

HIDS Schemes

It has been noted by Moni Naor that an IBE scheme can be immediately converted into a public key signature scheme as follows: the signer's private key is the master key in the IBE scheme. The signer's signature on M is the IBE decryption key d corresponding to the "public key" $H_1(ID)=H_1(M)$. The verifier checks the signature by choosing a random message M', encrypting M' with $H_1(M)$, and trying to decrypt the resulting ciphertext with d. If the ciphertext decrypts correctly, the signature is considered valid.

This observation can be extended to a hierarchical context: a HIDE scheme can be immediately converted to a hierarchical ID-based signature (HIDS) scheme. Suppose the signer has ID-tuple $(ID_1, \ldots, ID_t)$. To sign M, the signer computes the private key d for the ID-tuple $(ID_1, \ldots, ID_t, M)$, and sends d to the verifier. As before, the verifier checks the signature by choosing a random message M', encrypting M' with the "public key" $(ID_1, \ldots, ID_t, M)$, and trying to decrypt the resulting ciphertext with d. The security of this HIDS scheme follows immediately from the security of our HIDE scheme, since forging a signer's signature is equivalent to recovering the private key of one of the signer's children. In fact, the security of the HIDS scheme is based on the difficulty of solving the Diffie-Hellman problem in the group $\mathcal{B}_1$.

A pitfall in the HIDS scheme just described is that an attacker might try to get the signer to sign $M=ID_{t+1}$ where $ID_{t+1}$ represents an actual identity. In this case, the signer's signature will actually be a private key, which thereafter may be used to decrypt messages and forge signatures. One solution to this problem is to use some expedient—such as a bit prefix—that distinguishes between signing and private key extraction. Here is one embodiment.

Let $Level_i$ be the set of entities at level i, where $Level_0=\{Root\ PKG\}$. Let K be the security parameter given to the setup algorithm and let $\rightarrow$ be a BDH parameter generator.

Root Setup: The root PKG:

1. runs $\rightarrow$ on input K to generate groups $\mathcal{B}_1, \mathcal{B}_2$ of some prime order q and an admissible pairing $\hat{e}$: $\mathcal{B}_1 \times \mathcal{B}_1 \rightarrow \mathcal{B}_2$;
2. chooses an arbitrary generator $P_0 \in \mathcal{B}_1$;
3. picks a random $s_0 \in \mathbb{Z}/q\mathbb{Z}$ and sets $Q_0=s_0P_0$;
4. chooses cryptographic hash functions $H_1:\{0,1\}^* \rightarrow \mathcal{B}_1$ and $H_3:\{0,1\}^* \rightarrow \mathcal{B}_1$. The security analysis will treat $H_1$ and $H_3$ as random oracles.

The signature space is $S=\mathcal{B}_1^{t+1}$ where t is the level of the recipient. The system parameters are params=$\{\mathcal{B}_1, \mathcal{B}_2, \hat{e}, P_0, Q_0, H_1, H_3\}$. The root PKG's secret is $s_0 \in \mathbb{Z}/q\mathbb{Z}$.

Lower-level Setup. As in BasicHIDE.

Extraction: As in BasicHIDE.

Signing: To encrypt M with the ID-tuple $(ID_1, \ldots, ID_t)$ (using the secret point $$S_t = \sum_{i=1}^{t} s_{i-1} P_i$$

and the points $Q_i=s_iP_0$ for $1 \leq i \leq t$), do the following:

1. Compute $P_i=H_1(ID_1, \ldots, ID_i) \in \mathcal{B}_1$ for $1 \leq i \leq t$. (These can be precomputed.)
2. Compute $P_M=H_3(ID_1, \ldots, ID_t, M) \in \mathcal{B}_1$. (As suggested above, we might use a bit-prefix or some other method, instead of using a totally different hash function.)
3. Compute $Sig(ID\text{-tuple}, M)=S_t+s_tP_M$.
4. Send $Sig(ID\text{-tuple}, M)$ and $Q_i=s_iP_0$ for $1 \leq i \leq t$ Verification: Let $[Sig, Q_1, \ldots, Q_t] \in \rightarrow$ be the signature for (ID-tuple, M). The verifier confirms that:

$$\frac{\hat{e}(P_0, Sig)}{\hat{e}(Q_t, P_M) \prod_{i=2}^{t} \hat{e}(Q_{i-1}, P_i)} = \hat{e}(Q_0, P_1).$$

By modifying the above HIDS scheme so that an entity's point-tuple $(P_1, \ldots, P_t)$ is computed as a function not only of its ID-tuple $(ID_1, \ldots, ID_t)$, but also as a function of the points $Q_i=s_iP_0$, i.e. $P_i=H_1(ID_1, \ldots, ID_i, Q_1, \ldots, Q_i)$ for $1 \leq i \leq t$, we are able to obtain a stronger security proof. See the aforementioned U.S. patent application No. 60/366,196.

A dual HIDS scheme can be obtained as follows. If users y and z have a common ancestor in $Level_l$, then y only needs to send $Q_{yi}$ for $l+1 \leq i \leq m$. This makes the length of the signature proportional to m-l rather than m.

Figure 7:
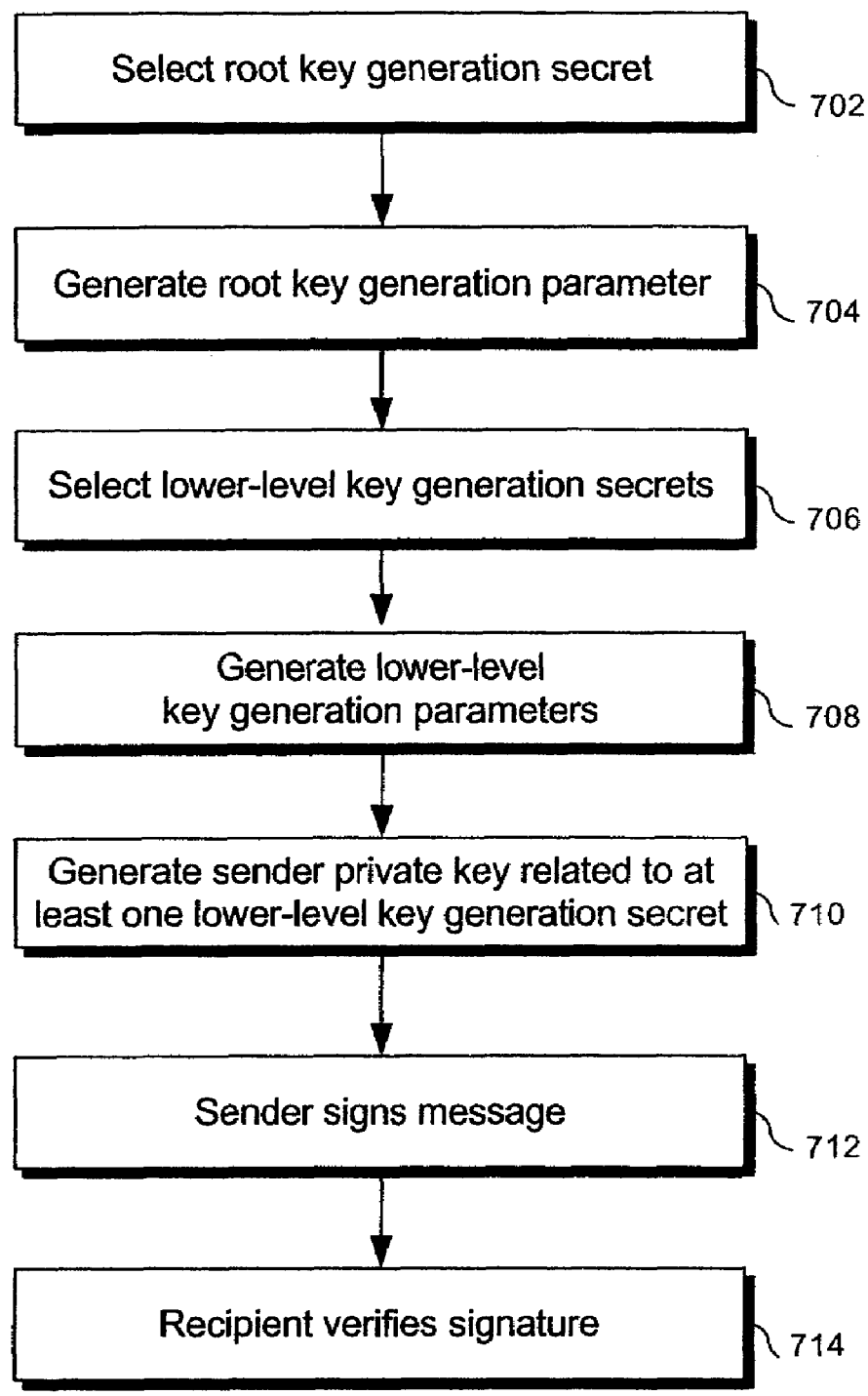
FIG. 7 shows a flow diagram illustrating a method of generating and verifying a digital signature according to another presently preferred embodiment of the invention.

Turning now to the signature, or HIDS, schemes of the present invention, FIG. 7 shows a flow diagram illustrating a method of generating and verifying a digital signature according to another presently preferred embodiment of the invention. The method is performed in a HIDS system including a plurality of PKGs. The PKGs include at least a root PKG and n lower-level PKGs in the hierarchy between the root PKG and the sender, or signer, wherein $n \geq 1$. In block 702, the root PKG selects a root key generation secret known only to the root PKG. The root key generation secret may be used to generate private keys for PKGs or users below the root PKG in the hierarchy. The root PKG then generates a root key generation parameter based on the root key generation secret in block 704. The lower-level PKGs select lower-level key generation secrets in block 706. The lower-level key generation secret associated with a given lower-level PKG may be used to generate private keys for PKGs or users below the associated lower-level PKG in the hierarchy. Like the root key generation secret, each of the lower-level key generation secrets is known only to its associated lower-level PKG. In block 708, lower-level key generation parameters are generated for each of the n lower-level PKGs. Each of the lower-level key generation parameters is generated using at least the lower-level key generation secret for its associated lower-level PKG.

In block 710, a lower-level PKG generates a private key for the recipient such that the private key is related to at least one of the n lower-level key generation secrets. For instance, the sender's private key may be related to at least to the lower-level key generation secret of the PKG that issued the private key to the recipient. Preferably, however, the recipient's private key may be related to all n of its ancestral PKG's lower-level key generation secrets, as well as the root key generation secret. In block 712, the sender uses at least its private key to sign the message and generate the digital signature. The recipient, or verifier, then verifies the digital signature in block 714 using at least one of the lower-level key generation parameters. For instance, the signature may be verified using only the root key generation parameter. Alternatively, one or more of the lower-level key generation parameters also may be used.

Figure 8:
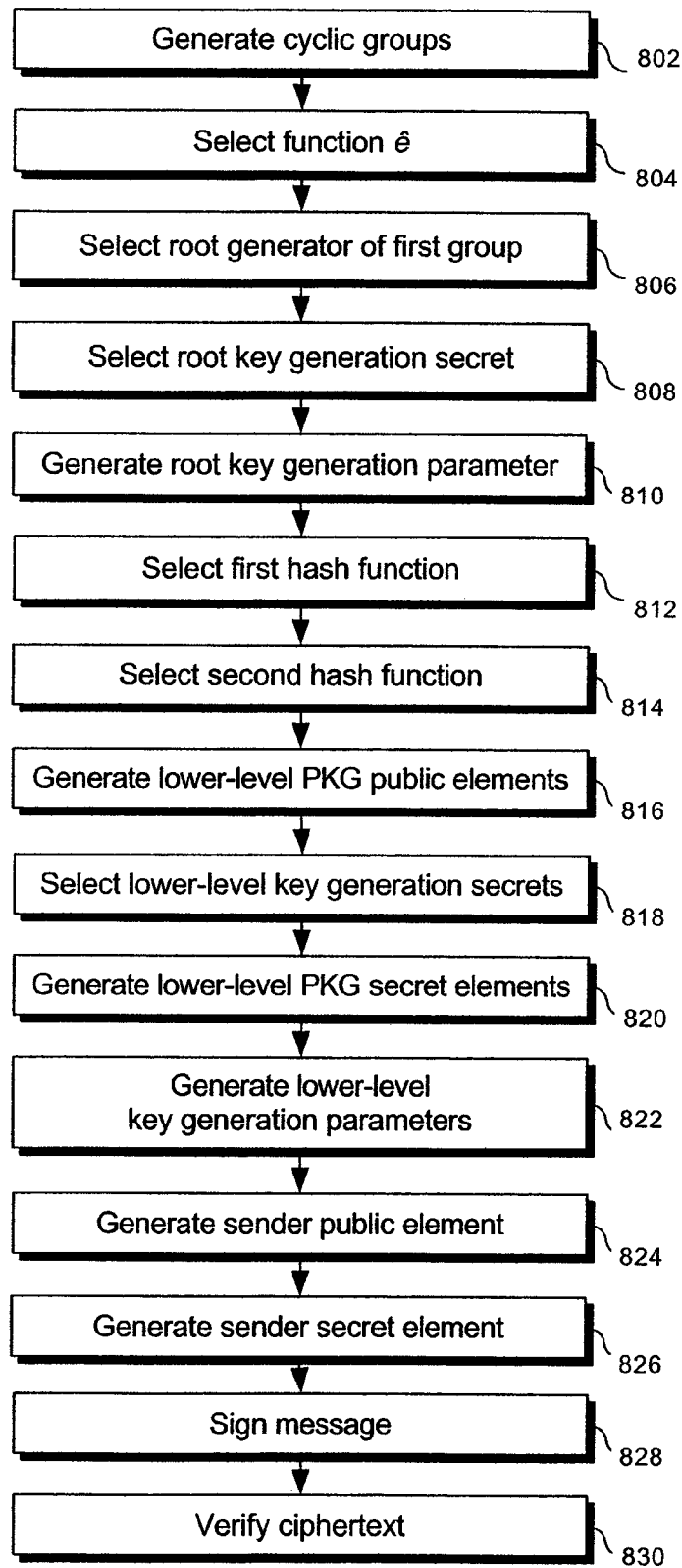
FIG. 8 shows a flow diagram illustrating a method of generating and verifying a digital signature Sig of a digital message M communicated between a sender y and a recipient z according to another presently preferred embodiment of the invention.

FIG. 8 shows a flow diagram illustrating a method of generating and verifying a digital signature Sig of a digital message M communicated between a sender y and a recipient z according to another presently preferred embodiment of the invention. The sender y 306 is m+1 levels below the root PKG in the hierarchy, as shown in FIG. 3, and is associated with the ID-tuple $(ID_{y1}, \ldots, ID_{y(m+1)})$. The sender's ID-tuple includes identity information $ID_{y(m+1)}$ associated with the sender, as well as identity information $ID_{yi}$ associated with each of its m ancestral lower-level PKGs in the hierarchy. The method begins in block 802 by generating first and second cyclic groups $\mathcal{B}_1$ and $\mathcal{B}_2$ of elements. In block 804, a function ê is selected, such that the function ê is capable of generating an element of the second cyclic group $\mathcal{B}_2$ from two elements of the first cyclic group $\mathbb{G}_1$. The function ê preferably is an admissible pairing, as described above. A root generator $P_0$ of the first cyclic group $\mathbb{G}_1$ is selected in block 806. In block 808, a random root key generation secret $s_0$ associated with and known only to the root PKG 302 is selected. Preferably, $s_0$ is an element of the cyclic group $\mathbb{Z}/q\mathbb{Z}$. A root key generation parameter $Q_0 = s_0 P_0$ is generated in block 810. Preferably, $Q_0$ is an element of the first cyclic group $\mathcal{B}_1$. In block 812, a first function $H_1$ is selected such that $H_1$ is capable of generating an element of the first cyclic group $\mathbb{G}_1$ from a first string of binary digits. A second function $H_3$ is selected in block 814, such that $H_3$ is capable of generating a second string of binary digits from an element of the second cyclic group $\mathbb{G}_2$. The functions of blocks 802 through 814 are part of the HIDS Root Setup algorithm described above, and preferably are performed at about the same time. By way of example, functions such as those disclosed in Boneh-Franklin may be used as $H_1$ and $H_3$. In fact, the functions $H_1$ and $H_3$ may be exactly the same function. However, there is a potential pitfall. An attacker may try to get the signer to sign $M=ID_t$, wherein $ID_t$ represents an actual identity. In this case, the signer's signature may actually be a private key, which thereafter may be used to decrypt messages and forge signatures. This pitfall may be avoided, however, by using some expedient—such as a bit prefix or a different function for $H_3$—that distinguishes between signing and private key extraction.

The next series of blocks (blocks 816 through 824) show the functions performed as part of Lower-level Setup algorithm. In block 816, a public element $P_{yi}$ is generated for each of the sender's m ancestral lower-level PKGs. Each of the public elements, $P_{yi}=H_1(ID_1, \ldots, ID_{yi})$ for $1 \leq i \leq m$, preferably is an element of the first cyclic group $\mathcal{B}_1$. Although represented in a single block, generation of all the public elements $P_{yi}$ may take place over time, rather than all at once.

A lower-level key generation secret $s_{yi}$ is selected (block 818) for each of the sender's m ancestral lower-level PKGs 304a,b,d. The lower-level key generation secrets $s_{yi}$ preferably are elements of the cyclic group $\mathbb{Z}/q\mathbb{Z}$ for $1 \leq i \leq m$, and each lower-level key generation secret $s_{yi}$ preferably is known only to its associated lower-level PKG. Again, although represented in a single block, selection of all the secrets $s_{yi}$ may take place over time, rather than all at once.

A lower-level secret element $S_{yi}$ is generated (block 820) for each of the sender's m ancestral lower-level PKGs. Each lower-level secret element, $S_{yi}=S_{y(i-1)}+s_{y(i-1)}P_{yi}$ for $1 \leq i \leq m$, preferably is an element of the first cyclic group $\mathcal{B}_1$. Although represented in a single block like the public elements $P_{yi}$ and the secrets $s_{yi}$, generation of all the secret elements $S_{yi}$ may take place over time, rather than all at once. For purposes of these iterative key generation processes, $S_0$ preferably is defined to be the identity element of $\mathcal{B}_1$.

A lower-level key generation parameter $Q_{yi}$ also is generated (block 824) for each of the sender's m ancestral lower-level PKGs. Each of the key generation parameters, $Q_{yi}=s_{yi}P_0$ for $1 \leq i \leq m$, preferably is an element of the first cyclic group $\mathcal{B}_1$. Again, although represented in a single block, generation of all the key generation parameters $Q_{yi}$ may take place over time, rather than all at once.

The functions of the next two blocks (blocks 824 and 826) are performed as part of the Extraction algorithm described above. A sender public element $P_{y(m+1)}$ associated with the sender y is generated in block 824. The sender public element, $P_{y(m+1)}=H_1(D_{y1}, \ldots, ID_{y(m+1)})$, preferably is an element of the first cyclic group $\mathcal{B}_1$. A sender secret element $S_{y(m+1)}$ associated with the sender y is then generated in block 826. The sender secret element $$S_{y(m+1)} = S_{ym} + s_{ym} P_{y(m+1)} = \sum_{i=1}^{m+1} s_{y(i-1)} P_{yi},$$

also preferably is an element of the first cyclic group $\mathcal{B}_1$.

For convenience, the first function $H_1$ optionally may be chosen to be an iterated function so that, for example, the public points $P_i$ may be computed as $H_1(P_{y(i-1)}, ID_{yi})$ rather than $H_1(ID_1, \ldots, ID_{yi})$.

The last two blocks shown in FIG. 8 (blocks 828 and 830) represent the Signing and Verification algorithms described above. In block 828, the message M is signed to generate a digital signature Sig. The signing preferably uses at least the sender secret element $S_{y(m+1)}$. The digital signature Sig is then verified in block 830. The verification preferably uses at least the root key generation parameter $Q_0$ and the lower-level key generation parameters $Q_{yi}$. The specific use of these parameters and elements in the signing of the message M and verification of the digital signature Sig will now be discussed with reference to FIG. 9.

Figure 9:
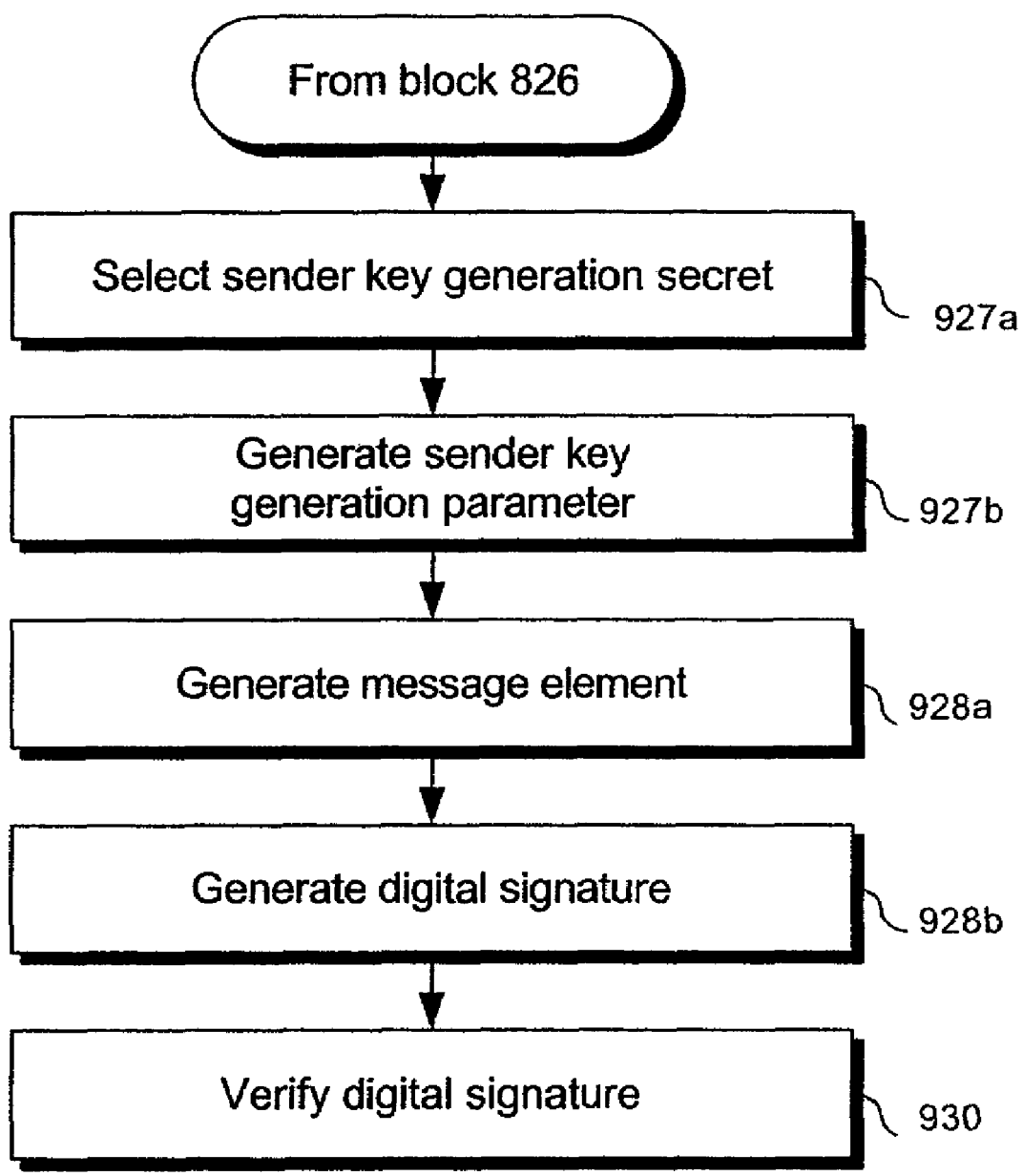
FIG. 9 shows a flow diagram illustrating a method of generating and verifying a digital signature Sig of a digital message M communicated between a sender y and a recipient z according to another presently preferred embodiment of the invention.

FIG. 9 shows a flow diagram illustrating a method of generating and verifying a digital signature Sig of a digital message M communicated between a sender y and a recipient z according to another presently preferred embodiment of the invention. In this scheme the Root Setup, Lower-level Setup, and Extraction algorithms are the same as for the embodiment shown in blocks 802 through 826 of FIG. 8. Accordingly, the flow diagram of FIG. 9 begins with the selection of a sender key generation secret $s_{y(m+1)}$, known only to the sender y, in block 927*a*. A sender key generation parameter $Q_{y(m+1)}$ associated with the sender is generated in block 927*b* using the formula $Q_{y(m+1)}=s_{y(m+1)}P_0$. The Signing algorithm then begins with the sender generating a message element $P_M=H_3(ID_{y1}, \ldots, ID_{y(m+1)}, M)$ in block 928*a*. The message element $P_M$ preferably is a member of the first cyclic group $\mathcal{B}_1$. The digital signature Sig itself is generated in block 928*b* using the formula $Sig=S_{y(m+1)}+s_{y(m+1)}P_M$. The recipient verifies the digital signature Sig (block 930) by confirming that the formula $$\frac{\hat{e}(P_0, Sig)}{\hat{e}(Q_{y(m+1)}, P_M)\prod_{i=2}^{m+1}\hat{e}(Q_{y(i-1)}, P_{yi})} = \hat{e}(Q_0, P_1)$$

is satisfied.

The invention has been described in detail with particular reference to preferred embodiments thereof and illustrative examples, but it will be understood that variations and modifications can be effected within the spirit and scope of the invention.

The invention claimed is:

1. A computer-implemented method of generating a digital signature on a message M for a signer $E_t$ which is an entity t levels below an entity $E_0$ in a hierarchical system including at least the entities $E_0, E_1, \ldots, E_t$, $t \geq 2$, wherein each entity $E_i$ (i=1, ..., t) is a child of entity $E_{i-1}$ in the hierarchical system, the method comprising:
   (1) obtaining the signer's secret key $S_t$ which is a member of a group $G_1$;
   (2) obtaining the signer's integer secret $s_t$;
   (3) generating a signature component Sig on the message M as a value $$Sig = S_t + s_t P_M$$

wherein:
   "+" is a group operation in the group $G_1$; and
   $P_M$ is a value depending on the message M and is a member of the group $G_1$.

2. The method of claim 1 wherein $$S_t = \sum_{i=1}^{t} s_{i-1} P_i,$$

wherein each $P_i$ is a public function of an identity of the entity $E_i$, and each $s_{i-1}$ is an integer secret of the entity $E_{i-1}$.

3. The method of claim 2 wherein in operation (1), the signer obtains $S_t$ from the entity $E_{t-1}$, and in operation (2) the signer generates $s_t$.

4. The method of claim 2, wherein each $P_i$ depends on the identity of each entity $E_j$ such that $1 \leq j \leq i$.

5. The method of claim 1 wherein:
   each entity $E_i$ (i>0) receives its secret key $S_i$ from the entity $E_{i-1}$;
   each entity $E_i$ (i<t) generates its secret $s_i$ and also generates a secret key $S_{i+1}$ as:

$$S_{i+1} = S_i + s_i P_{i+1}$$

and provides the secret key $S_{i+1}$ to the entity $E_{i+1}$;
   each entity $E_i$ ($0 \leq i \leq t$) generates a value $Q_i = s_i P_0$, where $P_0$ is a predefined element of the group $G_1$, and each entity $E_i$ ($1 \leq i \leq t$) obtains the values $Q_j$ for all j<i.

6. The method of claim 5 further comprising providing the signature component Sig to a verifier, wherein the verifier has access to values $\{Q_i\}$ for values i in a subset of integers from 0 to t inclusive.

7. The method of claim 6 wherein said subset of integers from 0 to t inclusive comprises each integer from 0 to t inclusive except the integer 1.

8. The method of claim 6 wherein said subset of integers from 0 to t inclusive is the set of all integers from L to t inclusive, where L is an integer greater than 1; and
   the verifier is a child of the entity $E_L$ in the hierarchical system.

9. The method of claim 5, wherein each $P_i$ depends on the identity of each entity $E_j$ such that $1 \leq j \leq i$ and also on each $Q_j$ such that $1 \leq j \leq i$.

10. A computer-implemented method of verifying a digital signature on a message M to verify that the digital signature is a valid signature by a signer $E_t$ which is an entity t levels below an entity $E_0$ in a hierarchical system including at least the entities $E_0, E_1, \ldots, E_t$, $t \geq 2$, wherein each entity $E_i$ (i=1, ..., t) is a child of entity $E_{i-1}$ in the hierarchical system, the method comprising:
   (1) obtaining a signature component Sig which is an element of a predefined group $G_1$;
   (2) obtaining one or more values $Q_i$ associated with respective one or more entities $E_i$, the one or more values $Q_i$ including a value $Q_t$;
   (3) confirming that $$\frac{\hat{e}(P_0, Sig)}{\hat{e}(Q_t, P_M)\prod_i \hat{e}(Q_{i-1}, P_i)} = V$$

wherein:
   $P_0$ is a predefined element of a group $G_1$;
   the product $\prod_i \hat{e}(Q_{i-1}, P_i)$ is taken over all integers i in a proper subset of the integers from 1 to t inclusive;
   each $Q_{i-1} = s_{i-1} P_0$, where $s_{i-1}$ is an integer secret of the entity $E_{i-1}$;
   $Q_t = s_t P_0$, where $s_t$ is an integer secret of the entity $E_t$;
   $\hat{e}$ is a bilinear non-degenerate mapping of $G_1 \times G_1$ into a predefined group $G_2$;
   $P_M$ is a value depending on the message M and is a member of the group $G_1$;
   each $P_i$ depends on an identity of the entity $E_i$;
   V is an element of the group $G_2$.

11. The method of claim 10 wherein the product $\prod_i \hat{e}(Q_{i-1}, P_i)$ is taken over all integers i from 1 to t inclusive except a predefined integer $i_0$, and $V = \hat{e}(Q_0, P_{i_0})$.

12. The method of claim 10 wherein the product $\prod_i \hat{e}(Q_{i-1}, P_i)$ is taken over all integers i from 2 to t inclusive, and $V = \hat{e}(Q_0, P_1)$.

13. The method of claim 10 wherein:
operations (1), (2), (3) are performed by an entity $E_{zm}$ which is m levels below the entity $E_0$ in the hierarchical system, and the hierarchical system includes the entities $E_{z(L+1)}, \ldots, E_{zm}$, wherein each entity $E_{zi}$ (i=L+1,...,m) is i levels below $E_0$, where L is a predefined integer greater than 1 and less than t and less than m;
the product $\Pi_i \hat{e}(Q_{i-1}, P_i)$ is taken over all integer i from L+1 to t inclusive; and $$V = \frac{\hat{e}(P_0, S_{zm})}{\prod_{i=L+1}^{m} \hat{e}(Q_{z(i-1)}, P_{zi})}$$

wherein:

$$S_{zm} = \sum_{i=1}^{L} s_{i-1} P_i + \sum_{i=L+1}^{m} s_{z(i-1)} P_{zi};$$

each $P_{zi}$ (i>L) is a public function of an identity of the entity $E_{zi}$;
each $s_{i-1}$ is an integer secret of the entity $E_{i-1}$, and each $s_{z(i-1)}$ is an integer secret of the entity $E_{z(i-1)}$.

14. The method of claim 10 wherein:
each entity $E_i$ (i>0) receives its secret key $S_i$ from the entity $E_{i-1}$;
each entity $E_i$ (i<t) generates its secret $s_i$ and also generates a secret key $S_{i+1}$ as:

$$S_{i+1} = S_i + s_i P_{i+1}$$

and provides the secret key $S_{i+1}$ to the entity $E_{i+1}$;
each entity $E_i$ ($0 \leq i \leq t$) generates a value $Q_i = s_i P_0$, where $P_0$ is a predefined element of the group $G_1$.

15. An apparatus operable to generate a digital signature on a message M for a signer $E_t$ which is an entity t levels below an entity $E_0$ in a hierarchical system including at least the entities $E_0, E_1, \ldots, E_t$, $t \geq 2$, wherein each entity $E_i$ (i=1,...,t) is a child of entity $E_{i-1}$ in the hierarchical system, the apparatus comprising circuitry for:
(1) obtaining the signer's secret key $S_t$ which is a member of a group $G_1$;
(2) obtaining the signer's integer secret $s_t$;
(3) generating a signature component Sig on the message M as a value $$Sig = S_t + s_t P_M$$

wherein:
"+" is a group operation in the group $G_1$; and
$P_M$ is a value depending on the message M and is a member of the group $G_1$.

16. The apparatus of claim 15 wherein $$S_t = \sum_{i=1}^{t} s_{i-1} P_i,$$

wherein each $P_i$ is a public function of an identity of the entity $E_i$, and each $s_{i-1}$ is an integer secret of the entity $E_{i-1}$.

17. The apparatus of claim 16 wherein in operation (1), the signer obtains $S_t$ from the entity $E_{t-1}$, and in operation (2) the signer generates $s_t$.

18. The apparatus of claim 16 wherein:
each entity $E_i$ (i>0) receives its secret key $S_i$ from the entity $E_{i-1}$;
each entity $E_i$ (i<t) generates its secret $s_i$ and also generates a secret key $S_{i+1}$ as:

$$S_{i+1} = S_i + s_i P_{i+1}$$

and provides the secret key $S_{i+1}$ to the entity $E_{i+1}$;
each entity $E_i$ ($0 \leq i \leq t$) generates a value $Q_i = s_i P_0$, where $P_0$ is a predefined element of the group $G_1$, and each entity $E_i$ ($1 \leq i \leq t$) obtains the values $Q_j$ for all j<i.

19. The apparatus of claim 18 wherein the apparatus is further for providing the signature component Sig to a verifier, wherein the verifier has access to values $\{Q_i\}$ for values i in a subset of integers from 0 to t inclusive, wherein said subset of integers from 0 to t inclusive comprises each integer from 0 to t inclusive except one integer.

20. The apparatus of claim 18 wherein said subset of integers from 0 to t inclusive is the set of all integers from L to t inclusive, where L is an integer greater than 1 and less than t; and
the verifier is a child of the entity $E_L$ in the hierarchical system.

21. An apparatus operable to verify a digital signature on a message M to confirm that the digital signature is a valid signature by a signer $E_t$ which is an entity t levels below an entity $E_0$ in a hierarchical system including at least the entities $E_0, E_1, \ldots, E_t$, $t \geq 2$, wherein each entity $E_i$ (i=1,...,t) is a child of entity $E_{i-1}$ in the hierarchical system, the apparatus comprising circuitry for:
(1) obtaining a signature component Sig which is an element of a predefined group $G_1$;
(2) obtaining one or more values $Q_i$ associated with respective one or more entities $E_i$, the one or more values $Q_i$ including a value $Q_t$;
(3) confirming that $$\frac{\hat{e}(P_0, Sig)}{\hat{e}(Q_t, P_M) \prod_i \hat{e}(Q_{i-1}, P_i)} = V$$

wherein:
$P_0$ is a predefined public element of a group $G_1$;
$\hat{e}$ is a bilinear non-degenerate mapping of $G_1 \times G_1$ into a predefined group $G_2$;
$P_M$ is a value depending on the message M and is a member of the group $G_1$;
each $P_i$ depends on an identity of the entity $E_i$;
V is an element of the group $G_2$.

22. The apparatus of claim 21 wherein the product $\Pi_i \hat{e}(Q_{i-1}, P_i)$ is taken over all integers i from 1 to t inclusive except one integer $i_0$, and $V = \hat{e}(Q_0, P_{i_0})$.

23. The apparatus of claim 22 wherein the product $\Pi_i \hat{e}(Q_{i-1}, P_i)$ is taken over all integer i from 2 to t inclusive, and $V = \hat{e}(Q_0, P_1)$.

24. The apparatus of claim 21 wherein:
operations (1), (2), (3) are performed for an entity which is m levels below the entity $E_0$ in the hierarchical system, and the hierarchical system includes the entities $E_{z(L+1)}, \ldots, E_{zm}$, wherein each entity $E_{zi}$ (i=L+1,...,m) is i levels below $E_0$, where L is a predefined integer greater than 1 and less than t and less than m;
the product $\Pi_i \hat{e}(Q_{i-1}, P_i)$ is taken over all integer i from L+1 to t inclusive; and $$V = \frac{\hat{e}(P_0, S_{zm})}{\prod_{i=L+1}^{m} \hat{e}(Q_{z(i-1)}, P_{zi})}$$

wherein:

$$S_{zm} = \sum_{i=1}^{L} s_{i-1} P_i + \sum_{i=L+1}^{m} s_{z(i-1)} P_{zi};$$

each $P_{zi}$ (i>L) is a public function of an identity of the entity $E_{zi}$;

each $s_{i-1}$ is an integer secret of the entity $E_{i-1}$, and each $s_{z(i-1)}$ is an integer secret of the entity $E_{z(i-1)}$.

25. The apparatus of claim 21 wherein:

each entity $E_i$ (i>0) receives its secret key $S_i$ from the entity $E_{i-1}$;

each entity $E_i$ (i<t) generates its secret $s_i$ and also generates a secret key $S_{i+1}$ as:

$$S_{i+1} = S_i + s_i P_{i+1}$$

and provides the secret key $S_{i+1}$ to the entity $E_{i+1}$;

each entity $E_i$ ($0 \leq i \leq t$) generates a value $Q_i = s_i P_0$, where $P_0$ is a predefined element of the group $G_1$.

* * * * *

UNITED STATES PATENT AND TRADEMARK OFFICE
CERTIFICATE OF CORRECTION

| | |
|---|---|
| PATENT NO. | : 7,590,854 B2 |
| APPLICATION NO. | : 11/923148 |
| DATED | : September 15, 2009 |
| INVENTOR(S) | : Gentry et al. |

It is certified that error appears in the above-identified patent and that said Letters Patent is hereby corrected as shown below:

In the Claims

In column 26, line 55 (claim 10), after "$Q_t = s_t P_0$, where" and before "is" change "$s_i$" to -- $s_t$ --.

Signed and Sealed this
Twenty-eighth Day of January, 2014

Michelle K. Lee
*Deputy Director of the United States Patent and Trademark Office*